United States Patent [19]

Ide et al.

[11] Patent Number: 5,743,654
[45] Date of Patent: Apr. 28, 1998

[54] HYDROSTATIC AND ACTIVE CONTROL MOVABLE PAD BEARING

[75] Inventors: Russell D. Ide, Exeter; Fouad Y. Zeidan, Warwick, both of R.I.

[73] Assignee: KMC, Inc., West Greenwich, R.I.

[21] Appl. No.: 107,367

[22] Filed: Aug. 17, 1993

Related U.S. Application Data

[63] Continuation-in-part of Ser. No. 878,601, May 5, 1992, Pat. No. 5,489,155, which is a continuation-in-part of Ser. No. 685,148, Apr. 15, 1991, abandoned, which is a continuation-in-part of Ser. No. 309,081, which is a continuation-in-part of PCT/US88/01841, May 27, 1988, Pat. No. 5,137,373, which is a continuation-in-part of Ser. No. 283,529, Oct. 25, 1988, Pat. No. 5,112,143, which is a continuation-in-part of Ser. No. 55,340, May 29, 1987, abandoned.

[51] Int. Cl.$^6$ .................................................. F16C 17/10
[52] U.S. Cl. ........................... 384/100; 384/117; 384/311
[58] Field of Search ................................. 384/100, 107, 384/117, 119, 122, 124, 125, 312, 311

[56] References Cited

U.S. PATENT DOCUMENTS

| | | |
|---|---|---|
| 1,664,878 | 4/1928 | Flintermann . |
| 1,991,461 | 2/1935 | Howarth . |
| 2,110,464 | 3/1938 | Kingsbury . |
| 2,137,487 | 11/1938 | Hall . |
| 2,314,703 | 3/1943 | Howarth . |
| 2,347,663 | 5/1944 | Carnahan . |
| 2,424,028 | 7/1947 | Haeberlein . |
| 2,873,683 | 2/1959 | Sherwood .................. 384/100 X |
| 3,004,804 | 10/1961 | Pinkus et al. .................. 384/311 |
| 3,107,955 | 10/1963 | Trumpler . |
| 3,132,908 | 5/1964 | Grotzinger . |
| 3,142,519 | 7/1964 | Abramovitz . |
| 3,160,450 | 12/1964 | Gentiluomo . |
| 3,298,751 | 1/1967 | Elwell . |
| 3,339,990 | 9/1967 | Wendt .................. 384/311 |
| 3,378,319 | 4/1968 | Cutting et al. .................. 384/100 |
| 3,384,425 | 5/1968 | Brown . |
| 3,549,215 | 12/1970 | Hollingsworth .................. 384/117 |
| 3,578,827 | 5/1971 | Smith . |
| 3,586,401 | 6/1971 | Gravelle . |
| 3,610,711 | 10/1971 | Mierley, Sr. .................. 384/311 X |
| 3,639,014 | 2/1972 | Sixsmith . |
| 3,677,612 | 7/1972 | Barnett et al. . |
| 3,887,245 | 6/1975 | Rauch .................. 384/100 X |
| 3,891,281 | 6/1975 | Jenness .................. 384/100 X |
| 3,899,224 | 8/1975 | Schueller et al. .................. 384/121 |
| 3,930,691 | 1/1976 | Greene . |
| 3,971,602 | 7/1976 | Anderson . |
| 4,005,914 | 2/1977 | Newman . |

(List continued on next page.)

FOREIGN PATENT DOCUMENTS

| | | | |
|---|---|---|---|
| 0170572 | 2/1986 | European Pat. Off. .................. 384/117 |
| 0206686 | 12/1986 | European Pat. Off. . |
| 1010959 | 6/1952 | France . |
| 879116 | 10/1961 | Germany . |
| 56-73222 | 6/1981 | Japan .................. 384/100 |
| 63-235723 | 9/1988 | Japan .................. 384/100 |
| 3-152435 | 6/1991 | Japan .................. 384/100 |
| 2197915 | 6/1988 | United Kingdom .................. 384/100 |

*Primary Examiner*—John P. Darling
*Attorney, Agent, or Firm*—Perman & Green, LLP

[57] ABSTRACT

A one piece hydrodynamic bearing which can include hydrostatic support features. The pads are supported on a single thin web for pivoting on a support structure which can include one or more beam-like members. The bearings may have hydrostatic and active control attributes and is very attractive in cryogenic applications where it is very difficult to prevent leakage in conventional hydrostatic tilt pad bearings. The hydrostatic feed through the post eliminates this problem completely and prevents the fretting at the pivots common with conventional tilt pad bearings. A cavity provided under a pad support membrane can be used as an active control device. The pressure can cause the bearing set or assembly clearance to be reduced thus providing better damping and centering capability. The preload in the pad can be actively controlled in this manner. The pad has a limiting device to prevent a negative pre-load condition from occurring. This active control of bearing clearance can allow bearings to operate at large spreads in temperatures.

18 Claims, 23 Drawing Sheets

U.S. PATENT DOCUMENTS

| | | | |
|---|---|---|---|
| 4,099,799 | 7/1978 | Etsion . | |
| 4,227,752 | 10/1980 | Wilcock . | |
| 4,300,808 | 11/1981 | Yoslmoka | 384/312 |
| 4,320,926 | 3/1982 | Heinemann et al. | 384/100 |
| 4,322,116 | 3/1982 | Heinemann et al. | 384/100 |
| 4,335,925 | 6/1982 | Stopp . | |
| 4,465,383 | 8/1984 | Heinemann et al. | 384/100 |
| 4,490,054 | 12/1984 | Kimmelaar | 384/117 |
| 4,496,251 | 1/1985 | Ide . | |
| 4,515,486 | 5/1985 | Ide | 384/117 |
| 4,526,482 | 7/1985 | Ide | 384/104 |
| 4,597,676 | 7/1986 | Vohr et al. | 384/117 X |
| 4,636,095 | 1/1987 | Gerlig | 384/117 |
| 4,643,592 | 2/1987 | Lewis et al. | 384/100 |
| 4,657,411 | 4/1987 | Bath . | |
| 4,668,106 | 5/1987 | Gu . | |
| 4,671,677 | 6/1987 | Heshmat et al. . | |
| 4,676,668 | 6/1987 | Ide . | |
| 4,699,525 | 10/1987 | Mizobuchi et al. . | |
| 4,726,695 | 2/1988 | Showalter . | |
| 4,738,453 | 4/1988 | Ide . | |
| 4,738,550 | 4/1988 | Gardner . | |
| 5,112,143 | 5/1992 | Ide | 384/117 |
| 5,137,373 | 8/1992 | Ide | 384/117 |
| 5,271,676 | 12/1993 | Keck et al. | 384/122 X |
| 5,288,153 | 2/1994 | Gardner | 384/311 |

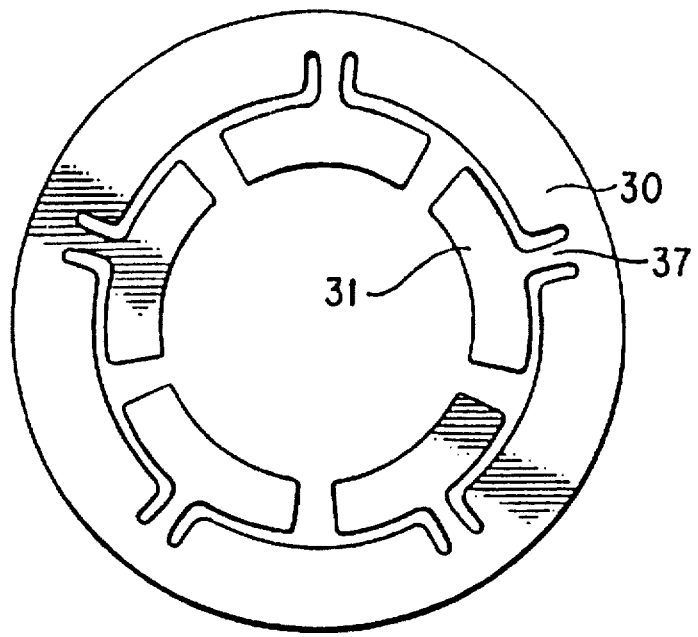
FIG. 1A
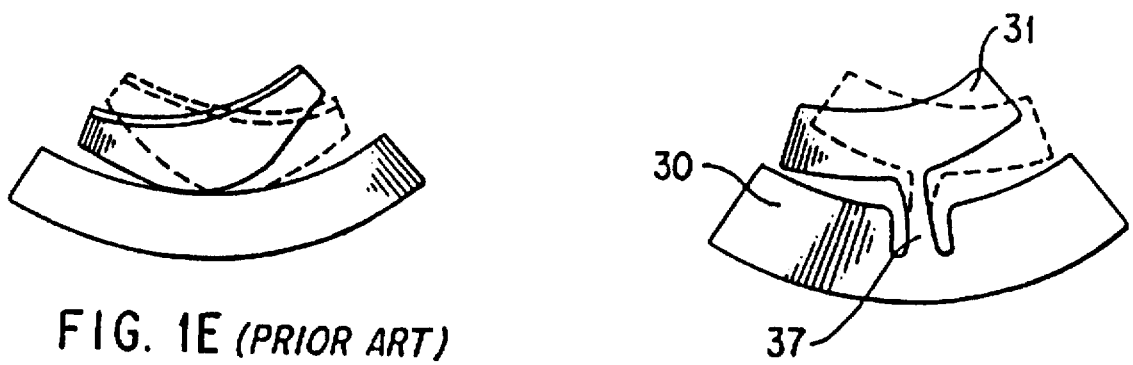
FIG. 1E (PRIOR ART)
FIG. 1D

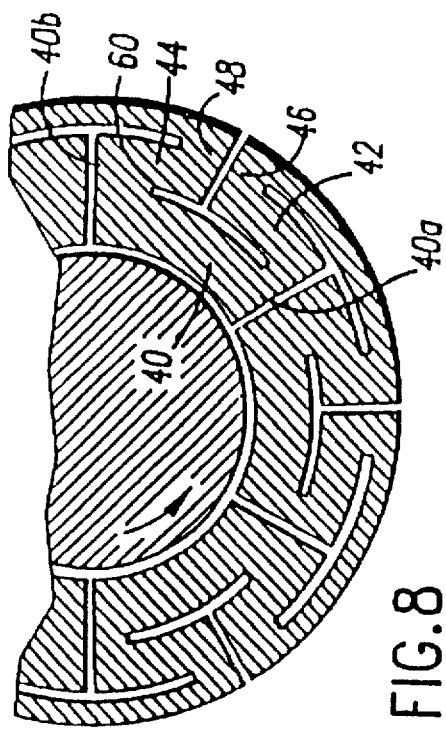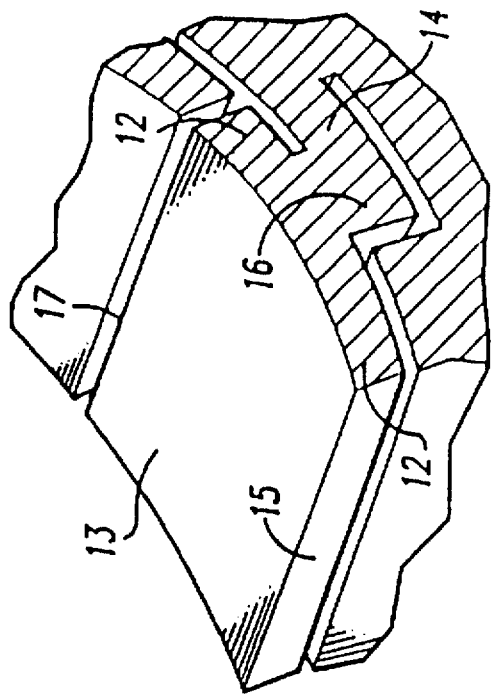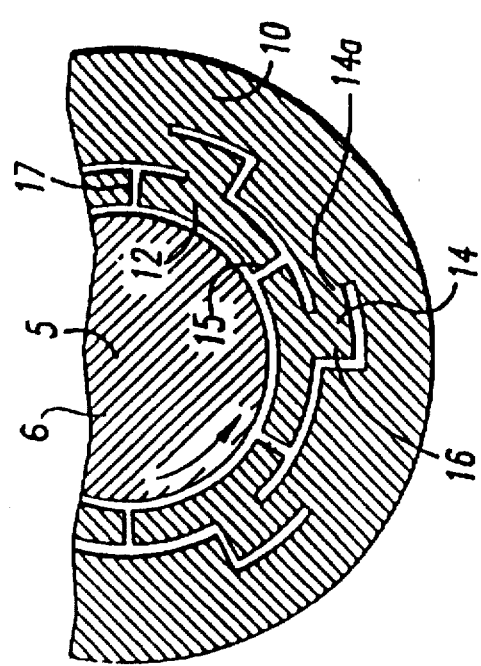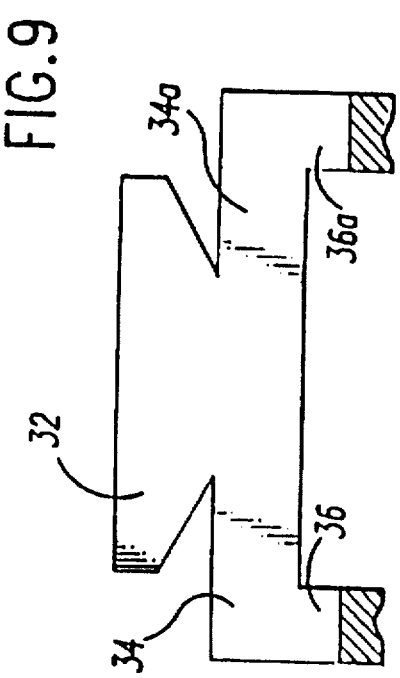

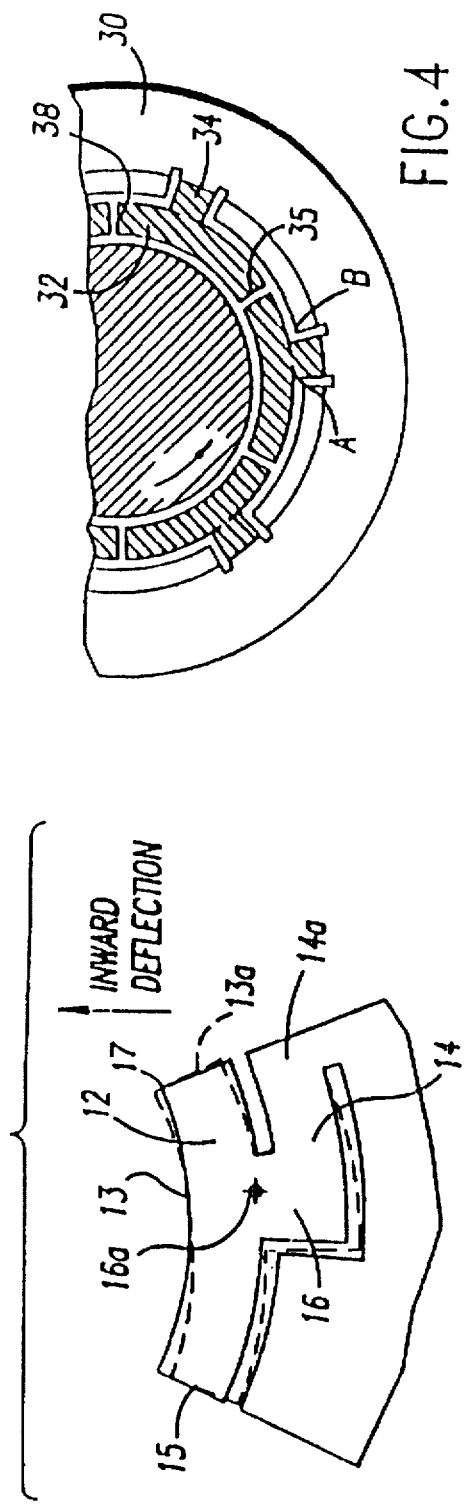
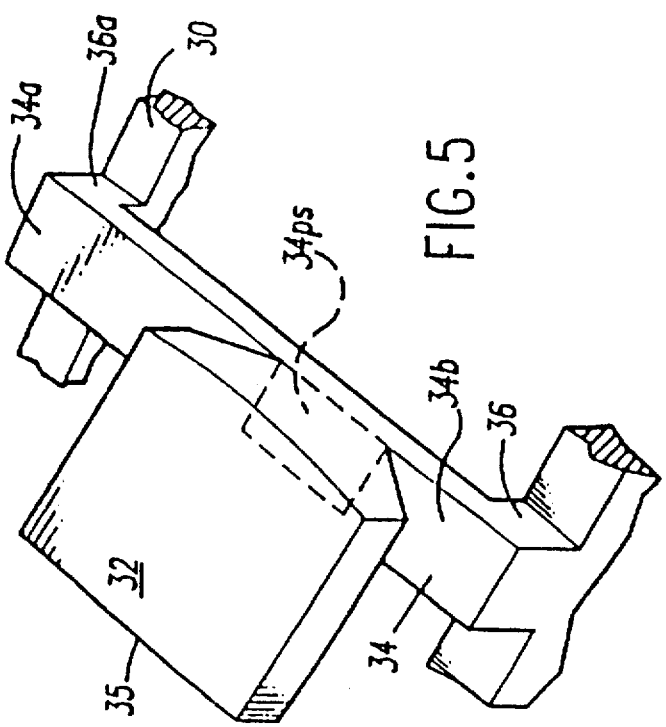
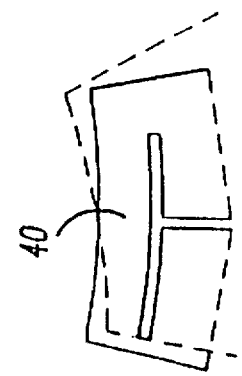
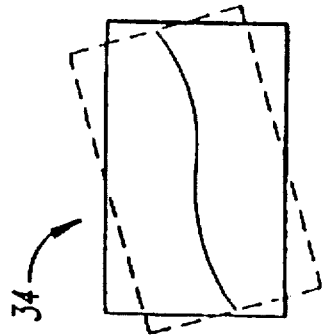
FIG.4
FIG.5
FIG.10
FIG.3
FIG.7

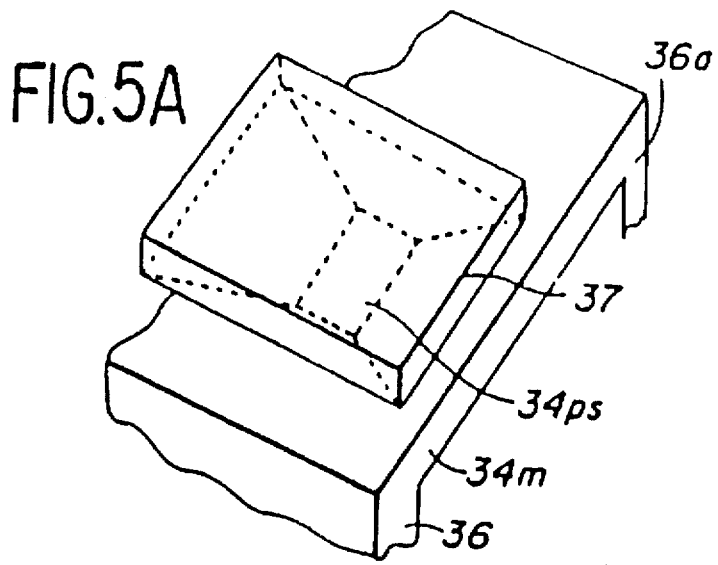
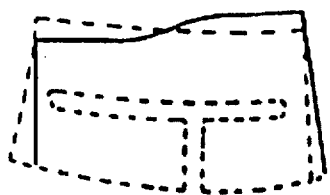
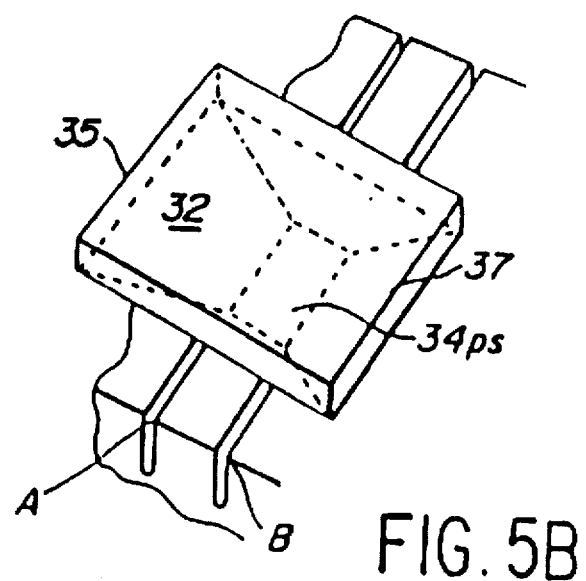

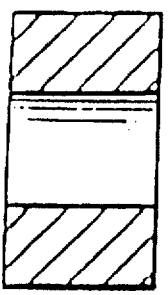 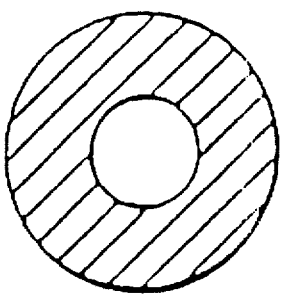 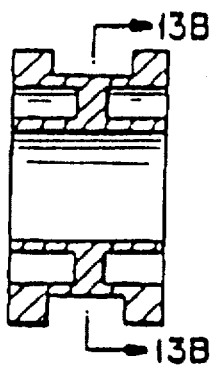 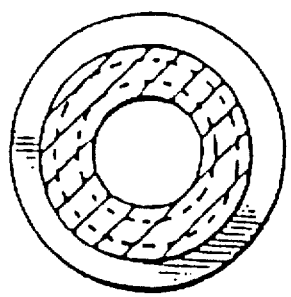
FIG.11A  FIG.11B  FIG.13A  FIG.13B
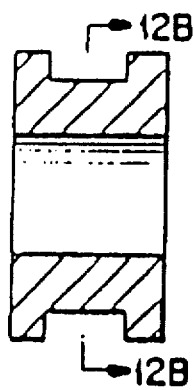 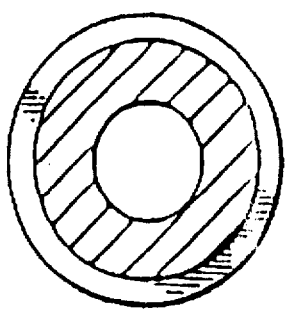 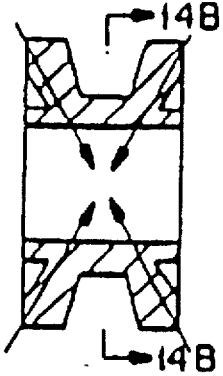 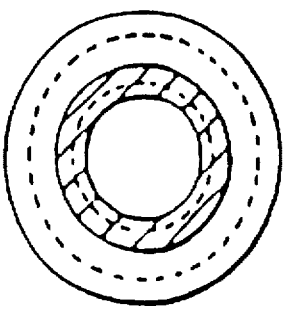
FIG.12A  FIG.12B  FIG.14A  FIG.14B
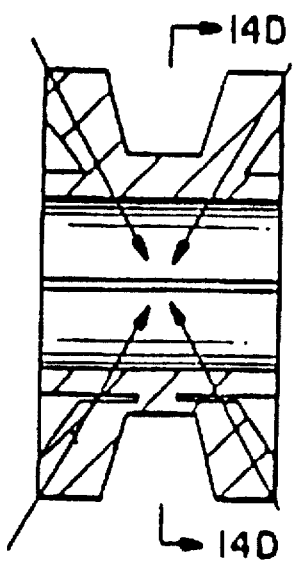 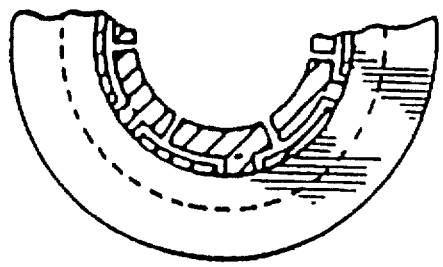
FIG.14C  FIG.14D

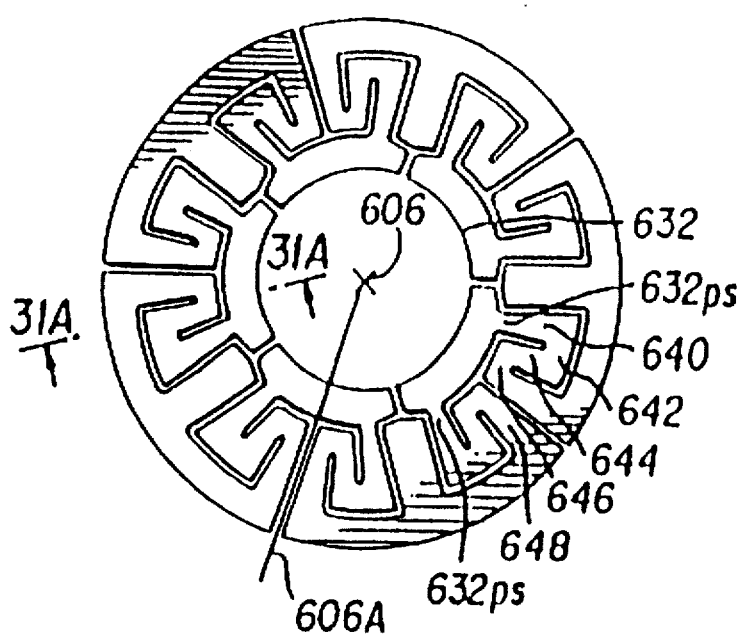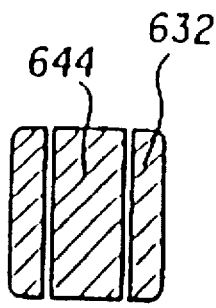
FIG. 31
FIG. 31A
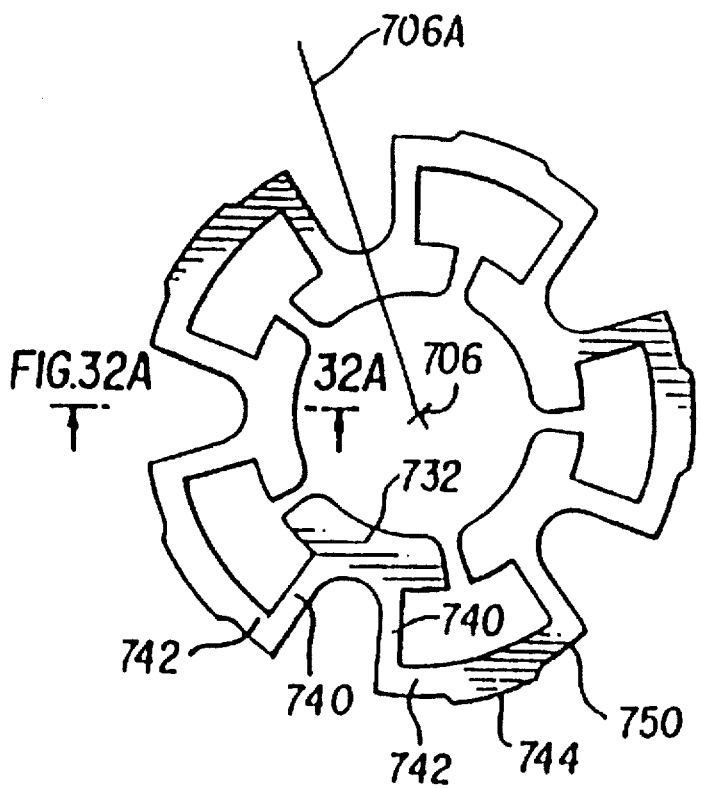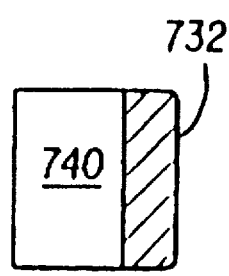
FIG. 32
FIG. 32A

HYDROSTATIC AND ACTIVE CONTROL MOVABLE PAD BEARING This application is a continuation-in-part (C.I.P) of, and claims the benefit of, 35 U.S.C. § 120 with respect to the applicant's U.S. application Ser. No. 07/878,601, filed May 5, 1992, now U.S. Pat. No. 5,489,155 which is a CIP of and claimed the benefit of application Ser. No. 07/685,148, filed Apr. 15, 1991 now abandoned, which is a CIP of and claimed the benefit of application Ser. No. 07/309,081, filed Feb. 8, 1989 now U.S. Pat. No. 5,137,373 which was a CIP of international application PCT/US88/01841, filed May 27, 1988, and corresponding U.S. application Ser. No. 07/283,529, filed Oct. 25, 1988 now U.S. Pat. No. 5,112,143, which in turn claimed the benefit of applicant's U.S. patent application Ser. No. 07/055,340, filed May 29, 1987 and now abandoned.

FIELD OF THE INVENTION

The present invention relates to pad type bearings which are especially, but not exclusively well suited to cryogenic applications. The bearings may be hydrostatic movable pad type bearings.

BACKGROUND OF THE INVENTION

Pad type bearings used in cryogenic (i.e., extremely low temperature) applications are subject to an unique set of operating conditions. The bearings must operate in temperatures in the range of −200° to −300° F. and the fluid used typically has a very low viscosity. As a result, the design of bearings for cryogenic applications such as pumps for use in space has proven difficult.

Known hydrostatic bearings include the type in which a pad is able to move or "float" within limits between the two relatively moving parts of the bearing. In this type of bearing, the pad has, in the past, been accommodated in a chamber or pocket in one of the two relatively moving parts, and, in operation is urged toward the other moving part by fluid pressure acting between the base of the chamber or pocket and the inside face of the pad. For acceptable operation of hydrostatic bearings, it has been found to be appropriate for each bearing pocket to be supplied from a separate pump, or for a shared pump to be incorporated for all or a group of bearing pockets, in which case each individual bearing pocket is preceded by a hydraulic resistance whereby a fall in the pressure in one bearing pocket does not adversely affect the feed to the other bearing pockets fed from the same pump. Since there is a passage through the pad and therefore the fluid pressure at the bearing surface also acts on the outside face of the pad, it is necessary to arrange that the effective area of the inside face is greater than that of the outer face, so that there is a differential force urging the pad outwardly when the hydrostatic bearing is operative.

There have been attempts to use conventional hydrostatic bearings in cryogenic applications. Such conventional hydrostatic bearings typically include separate pads which move by sliding with respect to a base. The relative sliding of these pieces leads to fretting at the pivot location. Moreover, because of this sliding, it is very difficult to prevent leakage in conventional hydrostatic bearings with a contact seal. This is especially true in applications such as cryogenic applications, involving the use of a low viscosity hydrostatic fluid.

In a more general sense, the present invention broadly relates to movable pad bearings. As such, applicants' previous bearing designs form a starting point for the present invention. In this sense, the present invention relates to hydrodynamic bearings that are also sometimes known as movable pad bearings and methods of making the same. Generally these bearings are mounted in such a way that they can move to permit the formation of a wedge-shaped film of lubricant between the relatively moving parts. Since excess fluid causes undesirable friction and power losses, the fluid thickness is preferably just enough to support the maximum load. This is true when the formation of the wedge is optimized.

Essentially the pad displaces with a pivoting or a swing-type motion about a center located in front of the pad surface, and bearing friction tends to open the wedge. When the formation of the wedge is optimized, the wedge extends across the entire pad face. Moreover, the wedge is formed at the lowest speed possible, ideally as soon as the shaft begins to rotate.

The so-called tilt-pad radial bearing is by far the most commonly-prescribed design for machines requiring maximum rotordynamic stability because of its exceptional stability characteristics. Consequently, it has become the standard by which many other radial bearings are measured when seeking a highly stable bearing design. The tilt-pad bearing's popularity is evidenced by the large number of applications found in industry, both as original equipment, and as aftermarket replacements. Applications range from small high-speed machines such as turbochargers and compressors, to very large equipment such as steam turbines and generators. The high rotordynamic stability comes from the reduction of cross-coupled stiffness that occurs when pads are free to tilt about their individual pivot points. This attenuates the destabilizing tangential oil film forces that can induce catastrophic subsynchronous vibration in machines equipped with conventional fixed-geometry bearings. Since so many machines are susceptible to this type of bearing-induced instability, there is a large demand for quality tilt-pad bearings.

Because of its many moving parts and manufacturing tolerances, the tilt-pad design is also the most complex and difficult to manufacture of all journal bearing designs. The design complexity is evident in the number of highly-machined parts required to make up the bearing. Clearance tolerances are additive in the built-up assembly of shell, pivots, and pads, requiring a high degree of manufacturing accuracy to yield acceptable radial shaft clearances. Pad pivot friction under high radial load can also lead to premature wear, or even fatigue failure, which can enlarge clearances and increase rotordynamic unbalance response. All of these requirements combine to make the tilt-pad bearing one which demands maximum attention to design, manufacturing, and materials.

The need for close tolerances manifests itself in known radial pad type bearings because it has been believed necessary to provide an accurately determined clearance between the bearing and the rotating object supported so as to allow the appropriate deflection of the bearing pads to form the hydrodynamic wedge. The requirement of close tolerances is particularly troublesome in the manufacture of gas lubricated bearings. Another problem with gas lubricated bearings is the breakdown of the fluid film at high speeds. These problems have limited the use of gas lubricated hydrodynamic bearings.

Moreover, there is still a need for a hydrodynamic radial bearing which can be used in applications where it is essential that the shaft remain centered. Currently, in applications where the shaft can not be allowed to float within a radial envelope, e.g., mechanical seals rotating element bearings are used. In rotating element type bearings, shaft centering is not a problem because the shaft is in effect maintained in solid contact with the housing. With conventional hydrodynamic bearings, however, the shaft is separated from the housing by a spacing known as the radial envelope and in operation the shaft is supported on a fluid film. Thus, because of the spacing between the shaft and the bearing surface in conventional hydrodynamic bearings, the center of the shaft tends to float or drift during operation. In mechanical seals, for example, this movement of the shaft leads to a problem known as "shaft run out" which defeats the operation of the mechanical seal. Alternatives to the commonly used tilt pad bearings have been proposed.

The focus of these attempts has been to provide simple bearing constructions which emulate the performance of more complex tilt pad bearings. For example, on pages 180–181 of *Lubrication: Its Principles and Practice*, Michell discusses a multiple pad bearing in which the pads are elastically pivoted on an annular member of which they form integral parts. The design shown is extremely rigid because the circumferential dimension of the neck supporting the pads is at least twice as great as the radial dimensions of the neck.

U.S. Pat. No. 2,424,028 to Haeberlein discloses a bearing member having two separate sections connected by bolts. The lower section is provided with segments and the upper section is continuous.

U.S. Pat. No. 3,107,955 to Trumpler discloses one example of a bearing having beam mounted bearing pads that displaces with a pivoting or swing-type motion about a center located in front of the pad surface. This bearing, like many prior art bearings, is based only on a two dimensional model of pad deflection. Consequently, optimum wedge formation is not achieved.

In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In the Greene Patent, U.S. Pat. No. 3,930,691, the rocking is provided by elastomers that are subject to contamination and deterioration.

U.S. Pat. No. 4,099,799 to Etsion discloses a non-unitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are disclosed.

There is shown in the Ide patent, U.S. Pat No. 4,496,251 a pad which deflects with these web-like ligaments so that a wedge shaped film of lubricant is formed between the relatively moving parts. The use of three spaced ligaments necessarily limits flexibility and prevents simple tilting action.

U.S. Pat. No. 4,515,486 discloses hydrodynamic thrust and journal bearings comprising a number of bearing pads, each having a face member and a support member that are separated and bonded together by an elastomeric material.

U.S. Pat. No. 4,526,482 discloses hydrodynamic bearings which are primarily intended for process lubricated applications, i.e., the bearing is designed to work in a fluid. The hydrodynamic bearings are formed with a central section of the load carrying surface that is more compliant than the remainder of the bearings such that they will deflect under load and form a pressure pocket of fluid to carry high loads.

It has also been noted, in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignment. These teachings are applicable to both journal and thrust bearings. While the disclosure of this patent represents a significant advance in the art, it has some shortcomings. One such shortcoming is the rigidity of the support structure and bearing pad which inhibits deformation of the pad surface. Further, the bearing construction is not unitary.

The last two patents are of particular interest because they demonstrate that despite the inherent and significant differences between thrust and journal bearings, there is some conceptual similarity between hydrodynamic journal bearings and hydrodynamic thrust bearings.

Prior art hydrodynamic bearings often suffer from fluid leakage which causes breakdown of the fluid film. In radial bearings, the leakage primarily occurs at the axial ends of the bearing pad surface. In thrust bearings, the leakage primarily occurs at the outer circumferential periphery of the pad surface as a result of centrifugal forces action on the fluid. When wedge formation is optimized, fluid leakage is minimized.

Many of today's modern turbomachines, especially those running at high speeds and low bearing loads, require the superior stability characteristics of tilt-pad journal bearings to prevent rotordynamic instabilities. Until now, the design complexity of tilt-pad bearings has precluded their use in many small, high-volume applications where cost and size are important.

SUMMARY OF THE INVENTION

The present invention discloses a pad type bearing which offers many of the rotordynamic advantages of tilt-pad bearings without the complexities of a multi-piece design. The pad type bearing, which is preferably unitary, can be formed from a single piece of heavy walled tubing or a cylindrical journal that has been machined or formed with small grooves and slits, bores or cuts through or on the bearing wall to define a flexible journal or thrust pad and a support structure. The pads and support structure are designed to optimize the shape of the converging wedge formed between the pad surface and the shaft when the shaft rotates. This can be done by modifying the pad shape, the support structure or both. Specifically, the pad can be modified to include grooves, cuts, rails and recesses to achieve desired deformations under load. The support structure can be designed to support the pads for movement in up to six degrees of freedom (i.e., translation or movement in the +x, −x, +y, −y, +z and −z directions) and rotation about the X, Y, and Z axes so as to optimize formation of the hydrodynamic wedge.

Although the bearings disclosed herein are primarily hydrodynamic in construction and operation, the performance of the bearings can be improved in certain applications, e.g. cryogenic applications, by providing hydrostatic lift. Thus, in accordance with the present invention, the principle of hydrostatic lift is applied to hydrodynamic bearings to, among other things, lessen the demand for hydrodynamic generation of pressure. More specifically, pressurized fluid may be supplied directly into the center of each of the bearing pads to provide a hydrostatic lift and facilitate operation of the bearing.

In the hydrostatic bearings of the present invention, the pads may be integrally formed as a single piece with the housing or supporting member. This greatly simplifies the construction of the hydrostatic bearing by, among other things, simplifying the manufacturing tolerances for the bearing. More specifically, when a number of discrete parts can be combined to a single integrally formed piece, the need for different tolerances for each specific part is eliminated in a single tolerance for the one part is needed. This avoids the problem of tolerance stack up.

Moreover, the use of an integral construction permits formation of the hydrostatic feed passage directly in the bearing. This obviates the need for flexible tubing to feed pressurized fluid to the hydrostatic recess thus reducing cost and improving reliability and performance. In addition, the need to seal between sliding surfaces is eliminated.

In accordance with another aspect of the present invention, the cavity under the flexible pad support can be used as an active control device. Pressure supplied to this cavity can cause the bearing set or assembly clearance to be reduced thus providing better damping and centering capability. The pre-load in the pad can be actively controlled in this manner. The pad has a limiting device, preferably in the form of a fine thread screw, to prevent a negative pre-load condition from occurring.

Active control of bearing clearance makes it possible to operate bearings across a wide range of temperatures. This is ideal for some cryogenic turbo-expander applications and modern high performance, high efficiency turbomachinery. The cavity with the hydrostatic feed can also provide squeeze film damping and enable the bearing to absorb shock type loading.

Thus, the present invention allows precise control of the preload and bearing set clearance in lightly loaded fluid film and gas bearings. The clearance can be adjusted after manufacturing to tune the bearing characteristics to the rotor being supported. The adjustment is made through the fine thread screw. The screw will move the pad inward changing the bearing clearance and preload.

The present invention also relates to a modular bearing construction in which the pad is formed separately from the supporting member. The pad and support may still be directly secured so as to function in a near tilt pad performance without parts being displaceable relative to one another. The use of a modular construction yields advantages both in terms of cost and performance.

In one embodiment, the present invention relates to a pad type bearing which includes a plurality of circumferentially spaced pads each supported on a housing by a single radially extending ligament. A bore or passage is formed through the ligament and/or the pad so as to provide communication between a fluid reservoir and a central, preferably recessed, region of the pad such that high pressure fluid may be forced through the bore so as to provide a hydrostatic lift at the central region of the pad.

The pad, support ligament and housing of the bearings of the present invention may be formed integrally as a single piece. Alternatively, the members may be formed as separate pieces which, in accordance with another aspect of the present invention, may be threaded into one another so as be releasably secured to one another. This enables a modular-type construction and also permits fine tuning or precise adjusting of the bearing. In one currently preferred example the flexure post is modular and not integral with the pad.

This post design allows interchangeability in the field. Moreover, it permits the use of softer and more compliant pad material while at the same time using a strong high endurance limit steelpost for support.

The post can be any shape or circular and can flex in both directions. The post or support ligament can flex along the circumferential direction to provide better stability, and it can flex axially to provide better alignment with the deflecting shaft. In addition, a centering spring and squeeze film damper with adjustable stiffness may be provided in the housing.

When the flexure pivot or radial support ligament is attached to the housing, it can easily be adapted for use as part of a hydrostatic lift system. In such constructions there is no need for high pressure flexible tubing since the hydrostatic feed can be directed through the side of the pad or through the post.

The bearings of the present invention can be designed in three dimensions to provide deflection with up to six degrees of freedom so as to ensure optimum wedge formation at all times. Specifically, it has been discovered that a hydrodynamic bearing operates most effectively when the hydrodynamic wedge has several characteristics. In particular, the wedge should extend across the entire pad surface; the wedge should have an appropriate thickness at all times; the wedge should be shaped so as to minimize fluid leakage; the wedge should accommodate misalignment such that the major axis of the bearing is colinear or substantially parallel to the axis of the shaft; and the wedge should be formed at the lowest speed possible to prevent damage to the wedge forming surface which generally occurs as a result of shaft to pad surface contact at low speeds.

With regard to thickness of the fluid film, it should be understood that the optimum thickness varies with loading. Under high or heavy loading, a relatively thick fluid film is desirable to adequately support the load. However, thicker films increase friction and power loss. Thus, the bearings are preferably designed to provide the minimum thickness necessary to support the shaft at maximum load.

The support structure is preferably unitary (one-piece) and comprises support stubs, beams, and/or membranes connected to a housing which is sometimes defined by the radially outermost portion of the bearing in the case of a journal bearing or, in the case of thrust bearings, a housing into which the bearing is mounted.

The inventor has discovered that in many specific applications such as in high speed applications, it is necessary to examine and evaluate the dynamic flexibility of the entire system consisting of the shaft or rotor, the hydrodynamic lubricating film and the bearing. In computer analysis of this system using a finite element model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the pad and support members defined by the bores, slits or cuts and grooves formed in the bearing. The shape of the support members has been found to be particularly important. Also by providing a fluid backing to the flexible members, a high degree of damping may be achieved that further adds to system stability. In some instances, this damping has replaced secondary squeeze film dampening that is present when the oil film is present between the casing of the bearing and the housing.

The inventor has also discovered that, with respect to gas or air lubricated deflection pad bearings, there are instances where loads or speeds exceed the capability of a gas film. In these cases, it is necessary to introduce a liquid type lubricant into the converging wedge without providing a liquid reservoir or bath. The present invention provides a bearing which solves this problem by providing liquid lubricant when necessary.

One embodiment of the bearing of the present invention includes a pad that may change shape and move in any direction (i.e., is supported for movement with six degrees of freedom). The bearing also may have a built-in damping system and is preferably of unitary or single piece construction for high volume economical manufacture. The journal bearings of the present invention also fits in a relatively small envelope (i.e., spacing between the housing outer diameter and the pad inner diameter).

Although the bearings of the present invention can be designed such that the bearings deflect with up to six degrees of freedom, such flexibility is not always necessary or desirable. For applications requiring more stability, the bearing pads can be supported for less than six degrees of freedom.

One bearing according to the present invention is composed of centrally-pivoted pads machined from a solid bronze puck through an Electric Discharge Machining (EDM) process. The support structure comprises a single narrow web supporting each of the pads with enough radial stiffness to support the shaft loads without becoming overstressed, while also providing enough rotational (tilt) flexibility to exhibit tilt-pad performance.

Optimization of the support structure configuration for individual applications precludes high stresses and assures long service life. The absence of moving parts eliminates pivot wear and durability concerns by eliminating the pad pivot contact stresses. Manufacturing tolerances are completely eliminated at all but the final bearing bore, thus simplifying the manufacturing process. EDM manufacturing is efficient and accurate for low-volume applications, while high-volume applications are either cast, extruded, or forged as discussed herein.

To obtain variable pad geometry in a one-piece design using a single ligament supporting its pad, the ligament must be flexible enough that the pads rotate with the load imposed by the rotating shaft. This characteristic, flexural rotation, distinguishes the present invention from other fluid film bearings. The capability of the pad to flex and rotate with the load allows cross coupling stiffness to approach zero as with a tilt pad bearing. This ensures stable operation. The web dimensions depend on the load being applied in a particular application and on other parameters which vary depending on the specific application and material construction of the bearing. The values for the rotational stiffness in a particular application are determined from a stability analysis where the stiffness is varied until a range is reached where the rotational flexibility provides performance comparable to tilt pad bearings. Tilt pad bearings tilt and build a pressure in the oil film which is symmetric around the shaft journal. The bearings of the present invention also tilt, but the tilt is not due to the rolling action as in standard tilt pad bearings. Instead, the tilt in the bearings of the present invention is due to the flexibility of the web section which allows the pad to rotate or tilt and accommodate the applied load. Although specific dimensions depend on the specific application, the ligaments should, as a rule, be longer in the radial direction than they are wide in the circumferential direction.

Another desirable feature available from the design of the bearings of the present invention is the narrower range of preload that can be obtained. Tilt pad bearings suffer from the stack-up in tolerances and thus result in a wide range of pre-load. This range increases as the bearing dimensions are reduced. The one-piece bearings of the present invention can, however, be manufactured to closer tolerances. In part, this is due to the fact that the position of the components relative to one another is fixed in a one-piece design. Thus, tolerances are not additive.

In accordance with the present invention, the need for close tolerances between the bearing pad and the shaft portion to be supported can be obviated by dimensioning the bearing so as to eliminate the spacing between the bearing pad and the shaft portion to be supported, while at the same time dimensioning the support structure such that the radial (in the case of a journal bearing) or axial (in the case of a thrust bearing) stiffness of the bearing is less that the corresponding fluid-film stiffness of the supporting fluid. Either the entire pad or only a portion thereof can be pre-biased into contact with the shaft. For instance, with extremely flexible bearings, it may be desirable to pre-torque the entire bearing pad into contact with the shaft. On the other hand, in some instances it is advantageous to pre-torque only the trailing edge of the bearing pad into contact with the shaft so as to define a hydrodynamic wedge. Thus, the bearings of the present invention can be designed to have an interference fit when installed on the shaft.

In one embodiment, as the bearing is forced onto the shaft, the pad support structure deflects slightly to form a converging wedge shape while in the installed, static position with contact between the bearing pad and the shaft at the trailing edge. In such an instance where the bearing is designed to provide a statically loaded wedge, an appropriate spacing between the pad and the shaft will be established instantaneously upon rotation of the shaft by virtue of the stiffness of the fluid film. This is because the fluid film enters the wedge and builds up fluid pressure causing separation of the shaft and pad. Specifically, the relatively stiff fluid causes the relatively flexible beam support structure to deflect until the stiffness of the support structure is equal to the fluid film stiffness. The instantaneous formation of the fluid film protects the surface of the bearing pad from damage which occurs at low start-up speeds when there is direct contact between the shaft.

Interference fit bearings of the aforementioned type allow a much larger variation in machining tolerances. For example, relatively large (e.g. 0.003 inch) variations in the interference fit can be designed to have an insignificant impact on the wedge. This is particularly critical for gas lubricated bearings where alternate bearing forms require extraordinarily precise machining for proper operation. The present invention relaxes machining requirements. The present invention provides a particular support structure which is especially well suited for interference fit applications. Such a support structure must provide both proper support under load and trailing edge contact at rest. To achieve this, the moment generated by the load acting at the trailing edge should act to turn the pad away from the shaft. A bearing designed in this way can be used to accurately center the shaft and hold the shaft in position until start up.

The present invention also relates to an improved variable geometry pad bearing that provides better shaft centering over the operating speed range than current bearings while also maintaining good rotor dynamic stability. Specifically, the present invention provides a new bearing design in which the stability characteristics of traditional bearings are maintained while also providing better shaft centering characteristics.

The bearing construction is a deflection pad bearing of the type described in applicant's previous application Ser. No. 07/785,005, now U.S. Pat. No. 5,246,295, filed Oct. 30, 1991 incorporated herein by reference. At least some of the bearing pads are provided with a support structure that allows the bearing pads to contact the shaft at rest. These bearing pads which are in contact with the shaft at rest maintain the shaft in the proper centered position. The cantilevered centering pads begin at zero clearance and expand at speed under hydrodynamic pressure to a larger operating clearance. The larger centrally-pivoted pads offer low pivot rotational stiffness and high radial stiffness to attenuate unbalance response and maintain stability. Studies of this bearing construction have shown that such a one-piece journal bearing which includes pads supported by a single ligament can offer favorable rotordynamic stability comparable to that of a tilt-pad bearing, without the cost and complexity of a multi-piece design. Stresses induced in the ligaments, both from journal radial loads, and from pad tilting action, are well below the material fatigue limits, thus assuring long service life. This is largely because of the very small tilt oscillations traversed by the pads during operation, limiting the corresponding induced stresses to values which are inconsequential.

In accordance with the present invention, a number of methods of manufacturing the bearings of the present invention are also contemplated. The selection of a particular method of manufacturing depends largely on the volume of the particular bearing to be manufactured and the materials used. In low volume applications, or when it is desired to produce prototypes for testing and/or production of molds or the like, the bearings are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting. In intermediate volumes, the bearings of the present invention are preferably manufactured using an investment casting method in accordance with the present invention. In high volume applications, the bearings of the present invention can be manufactured using a wide variety of materials such as plastics, ceramics, powdered and non-powdered metals, and composites. In high volume applications, a number of manufacturing methods, including injection molding, casting, powdered metal, die casting, and extrusion, can be economically employed. The bearings of the present invention can be formed in a shape which is easily moldable.

In short, the present invention relates to hydrodynamic radial and hydrostatic bearings which perform significantly better than known bearings and can be manufactured at a fraction of the cost of competitive bearings.

BRIEF DESCRIPTION OF THE DRAWINGS

The details of the invention will be described in connection with the accompanying drawing, in which:

FIG. 1A is a side view of a tilting pad bearing according to the present invention.

FIG. 1D is a side view of one tilt supported bearing pad showing the tilting of the pad under load.

FIG. 1E is a side view of a pad of a prior art tilt pad bearing.

FIG. 2 is a schematic view of a single pad made in accordance with the example illustrated in FIG. 1.

FIG. 2A is a sectional view of a journal bearing illustrating a sector thereof embodying one form of the invention.

FIG. 3 is an edge view of the pad of FIG. 2 illustrating the pad orientation with the support structure in the loaded state.

FIG. 4 is a sectional view of a sector of a second example of a journal bearing made in accordance with the present invention.

FIG. 5 is a view partly in section of a single pad of FIG. 4.

FIG. 5A is a perspective view of a section of a modified form of the bearing of FIG. 4.

FIG. 5B is a perspective view of a modified form of the bearing shown in FIG. 4.

FIG. 6 is an end view of the bearing of FIG. 4.

FIG. 7 is a diagrammatic view of the torsional deflection of a beam, greatly enlarged.

FIG. 8 is a sectional view of a journal bearing illustrating an example of a bearing incorporating the features of the present invention which includes two beams.

FIG. 9 is an edge view of the pad of FIG. 1 illustrating local deflection of the pad surface without support structure deflection, greatly exaggerated.

FIG. 10 is an edge view of the pad of FIG. 8 illustrating the pad orientation with the support structure in the loaded state.

FIG. 10A is an edge view of the pad of FIG. 8 illustrating local deflection of the pad surface greatly exaggerated.

FIGS. 11A and 11B are cross sectional views of a cylindrical journal or blank prior to machining.

FIGS. 12A and 12B are cross sectional views of a machined journal or blank.

FIGS. 13A and 13B are cross-sectional views of a further machined journal or blank.

FIGS. 14A and 14B are cross sectional views of a modified machined journal or blank.

FIGS. 14C and 14D are cross sectional views of a bearing constructed from the modified machined journal or blank of FIGS. 14A and 14B.

FIG. 31 is a side view of another journal bearing construction in accordance with the present invention.

FIG. 31A is a radial cross-section of a portion of the bearing illustrated in FIG. 31.

FIG. 32 is a side view of another journal bearing construction in accordance with the present invention.

FIG. 32A is a radial cross-section of the bearing of FIG. 32.

DETAILED DESCRIPTION

Figure 1B:
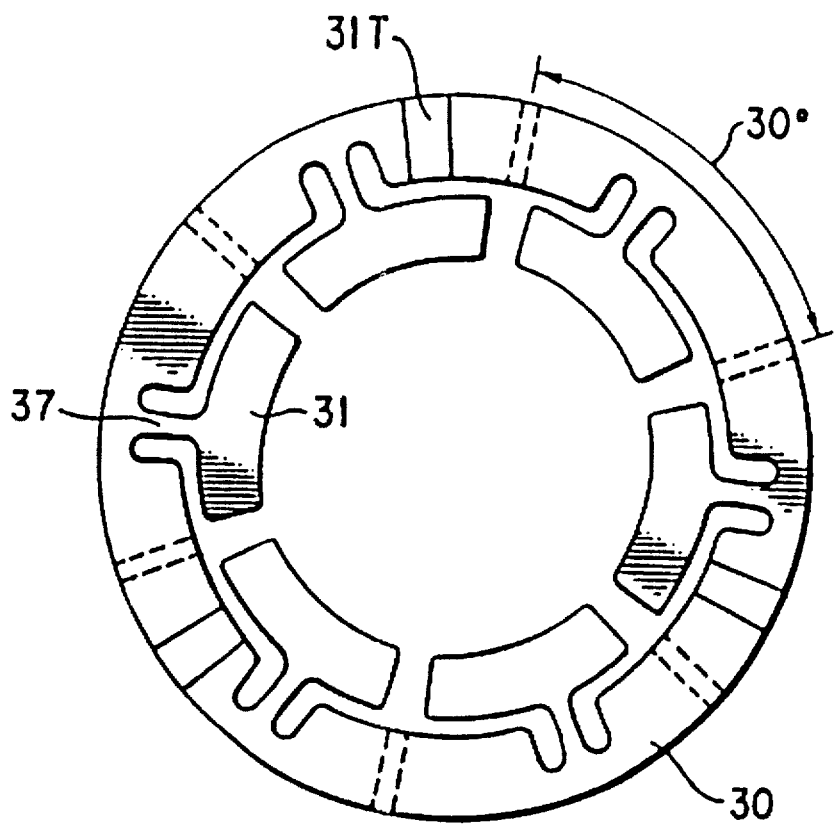
FIG. 1B is a side view of another tilting pad bearing according to the present invention.

In describing the bearings of the present invention in an understandable way, it is helpful to describe the bearing structures as being formed from a cylindrical blank by providing grooves, slits, bores and other openings in the cylindrical blank. As noted below, this is sometimes a useful technique for manufacturing a prototype bearing. However, the reference to the cylindrical blank is primarily intended to assist understanding of the present invention. It should be noted that although many of the bearings of the present invention could be manufactured from a cylindrical blank, it is not necessary that any of them be so manufactured. Indeed the bearings can be manufactured in numerous ways, some of which are discussed hereinafter.

Although the present invention provides a bearing construction which can be designed such that the pads are free to move in six directions, such freedom of movement is not always needed. For example, in conventional tilt bearings, see FIG. 1E, the individual pads need only tilt or pivot about an axis parallel to the rotor. A known rocker pivot pad has nearly zero rotational pivot stiffness. Such bearings are known to provide adequate performance, but they are expensive and difficult to tailor to individual applications. The function and performance can be replicated using bearings of the present invention which are of course, significantly less expensive than rocker pivot pad bearings.

The present invention also relates to one piece bearings designed to operate as tilt-pad bearings in a lubricant filled environment. In particular, the present inventor has found that the performance of expensive multi-part rocker pivot pad bearings can be replicated in a single piece bearing in which the pads are supported on a single thin web. The pivot stiffness of such a pad is determined by the support web thickness. When the web thickness is low enough, tilt-pad behavior results as illustrated in FIG. 1D.

The effect of web thickness is typically expressed in terms of the principal stresses and cross coupled stiffness. Cross coupled stiffness is a term of art which can be thought of as a measure of the resistance to tilting. As tilt stiffness drops, the cross-coupling terms asymptotically approach zero, which by definition yields tilt-pad behavior. At high pad tilt stiffness, the cross-coupling asymptotically approaches the high (negative) fixed-geometry values, resulting in much lower stability that is characteristic of fixed-geometry bearings. The principle coefficients vary slightly from the asymmetric (unequal) fixed-geometry values, to symmetric (equal) values that are characteristic of a four-pad tilt-pad bearing with load between pads.

In general, tests and analysis have shown that the one piece tilt pad bearing of the present invention exhibits fixed-geometry performance with high tilt stiffness, and tilt-pad, variable geometry, performance at low tilt stiffness. Intermediate stiffnesses reflect transition from fixed-geometry behavior to tilt-pad behavior. Thus, the web thickness must be chosen low enough to exhibit tilt-pad stability without becoming overstressed from shaft loads or tilt stresses. The tilt-stresses are low because of the very small tilt angles traversed by the pads during operation.

Another desirable feature available from the design of the bearings of the present invention is the narrower range of pre-load that can be obtained. Tilt pad bearings suffer from the stack-up in tolerances and thus result in a wide range of pre-load. This range increases as the bearing dimensions are reduced. The one-piece bearings of the present invention can, however, be manufactured to closer tolerances. In part, this is due to the fact that the position of the components relative to one another is fixed in a one-piece design. Thus, tolerances are not additive.

FIG. 1A illustrates one form of tilt pad bearing according to the present invention. The bearing is designed to operate in a liquid filled environment. In operation, the pads tilt so as to pressurize the liquid. As shown, the bearing includes five spaced bearing pads 31. The number of bearing pads can, of course, be varied to suit any particular application. The bearing pads 31 are each supported on a bearing housing 30 via a single thin web-like ligament 37. As shown, the ligament has a radial length which significantly exceeds its circumferential width.

In the embodiment illustrated the web 37 is provided on the circumferential center line of the pad 31 so that the bearing supports the shaft rotation in either the clockwise or counterclockwise direction, i.e., the bearing is bidirectional. The web 37 extends generally radially between the pads and the bearing housing. The bearing may be formed by machining a solid bronze puck through an electric discharge machining (EDM) process, but this is not required. According to the present invention, the webs 37 must support the pad with enough radial stiffness to support the shaft loads without becoming overstressed, while also providing enough rotational (tilt) flexibility to exhibit tilt-pad performance. Although the acceptable range of web thickness varies from application to application, the present inventor has found that the web thickness should, at minimum be less than the radial length of the web. If the webs are too thin, the web will be overstressed and the bearing will be destroyed. On the other hand, if the webs are too thick the pads will no longer function as tilt pads, instead functioning either in the transition regime or as fixed geometry pads. Of course, the stresses that result from tilting must also be within the endurance limit to avoid fatigue failure. The endurance limit is defined as the allowable stress below which you can have an infinite number of cycles. Other facts that can affect performance include thermal effects and pad surface deflections. Optimization of the support structure configuration for individual applications precludes high stresses and ensures long life. As mentioned previously stresses are minimized because of the small tilt angle. The absence of moving parts eliminates pivot wear and durability concerns by eliminating the pivot pad contact stresses. Manufacturing tolerances are completely eliminated all but the final bearing bore, thus simplifying the manufacturing process. EDM manufacturing is efficient and accurate for low volume applications, while high volume applications can be cast, molded, extruded or forged as discussed herein.

FIGS. 1D and 1E show a comparison of the tilting pad function of the tilt pad bearings of the present invention (FIG. 1D) with a conventional tilting pad construction (FIG. 1E).

As is illustrated therein the simple one piece tilt pad bearing construction of the present invention pivots in essentially the same manner as a conventional pivot bearing. Again, the critical design feature for successfully replicating the performance of a tilt-pad bearing is providing the appropriate web thickness.

It should noted that FIG. 1A illustrates a bearing which is extremely simple and is designed to simply replicate the performance of a pivot pad bearing. Consistent with the teachings of the present invention, however, this bearing construction can be further modified to provide additional flexibility if desired. For instance, facing grooves can be provided in any sides of the bearing to reduce the axial thickness of the web so as to enhance the ability of the pads to twist to accommodate shaft misalignment. Moreover, the outer periphery of the bearing housing can be formed with grooves or projections to increase the radial flexibility of the pads so that the pads can move in the radial direction.

In accordance with one aspect of the present invention, a tilting pad bearing of the type described in connection with FIG. 1A, for example, may be provided with a centering spring and squeeze film damper without altering the integral one-piece nature of these bearings. Separate adjusting screws may be provided to adjust the damping and spring characteristic and in accordance with the currently preferred embodiment the bearing preload may be actively controlled.

Figure 15:
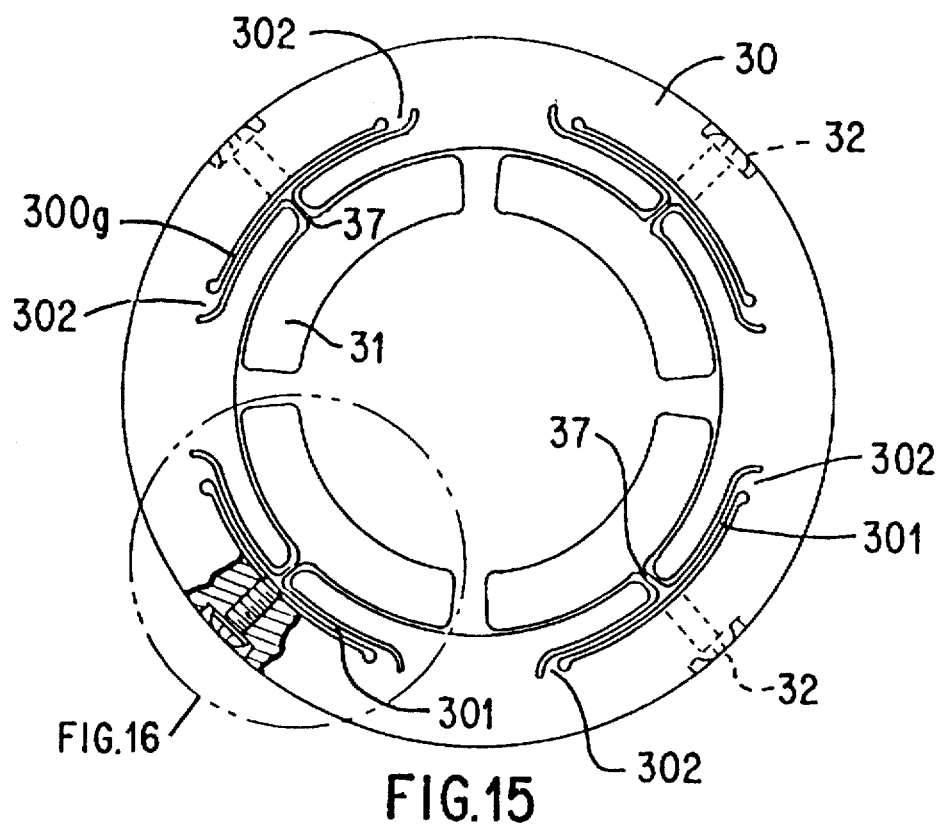
FIG. 15 is a side view, partially in section, of a tilt pad bearing with a centering spring and squeeze film damper according to the present invention.
Figure 16:
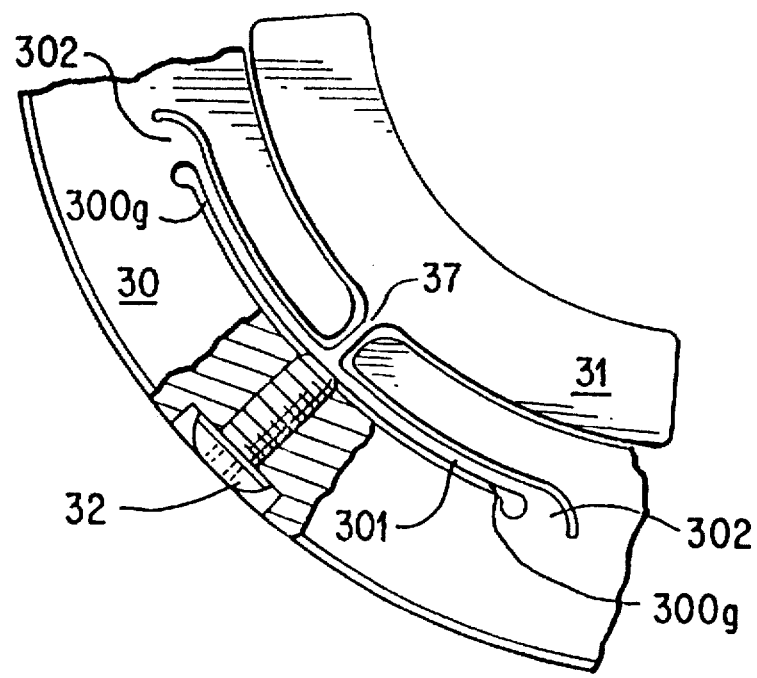
FIG. 16 is a detail view of FIG. 15 as indicated.

As shown in FIGS. 15 and 16 the bearing is similar in construction to that shown in FIG. 1A. The bearing includes a plurality of circumferentially spaced pads 31, a housing and a plurality of thin webs or posts 37 which support the pads 31 on the housing 30. In the embodiment shown, the webs 37 are very thin so as to provide little tilting stiffness. As discussed above, such a support closely replicates the performance of a multi-part tilt pad bearing. In addition, the web 37 is supported on a thin membrane 301 which is supported on each circumferential end by a short stub-like beam 302. As is readily apparent from FIGS. 15 and 16, the membrane 301 and support stubs 302 may be defined by providing cuts in the housing 30 as described elsewhere herein. Naturally, other forms of membrane constructions may be used and other damper constructions may also be used, but the embodiment shown is currently preferred. The gap 300g between the main body of the housing 30 and the thin membrane 301 is filled with an incompressible fluid such as oil. The movement of the membrane radially up and down is dampened in the manner of a squeeze film damper. In addition, by virtue of its support on the stubs 302 the membrane 301 provides a spring-like support for the web 37 and the pads 31 supported on the web. Thus, the overall construction shown in FIGS. 15 and 16 is in the nature of a tilting pad bearing with a centering spring and squeeze film damper. Again, all of this is provided in a single one-piece bearing construction, i.e., a construction in which the pads, support ligaments or posts and housing are all integrally formed as a single piece.

By providing separate screws 32 as shown in FIGS. 15 and 16, a stop means may be provided to permit adjustment of the preload in the bearing. The screw 32 can be circumferentially offset and set back to a wide range of positions to allow radial movement of the pad 31 due to vibration or thermal growth. If the screw 32 is placed in the middle, as shown, it will restrict the radial movement and allow the bearing to operate with a squeeze film effect. A bearing construction of the type shown in FIGS. 15 and 16 can be very useful for very high speed bearing applications and for use as a gas bearing.

Figure 17:
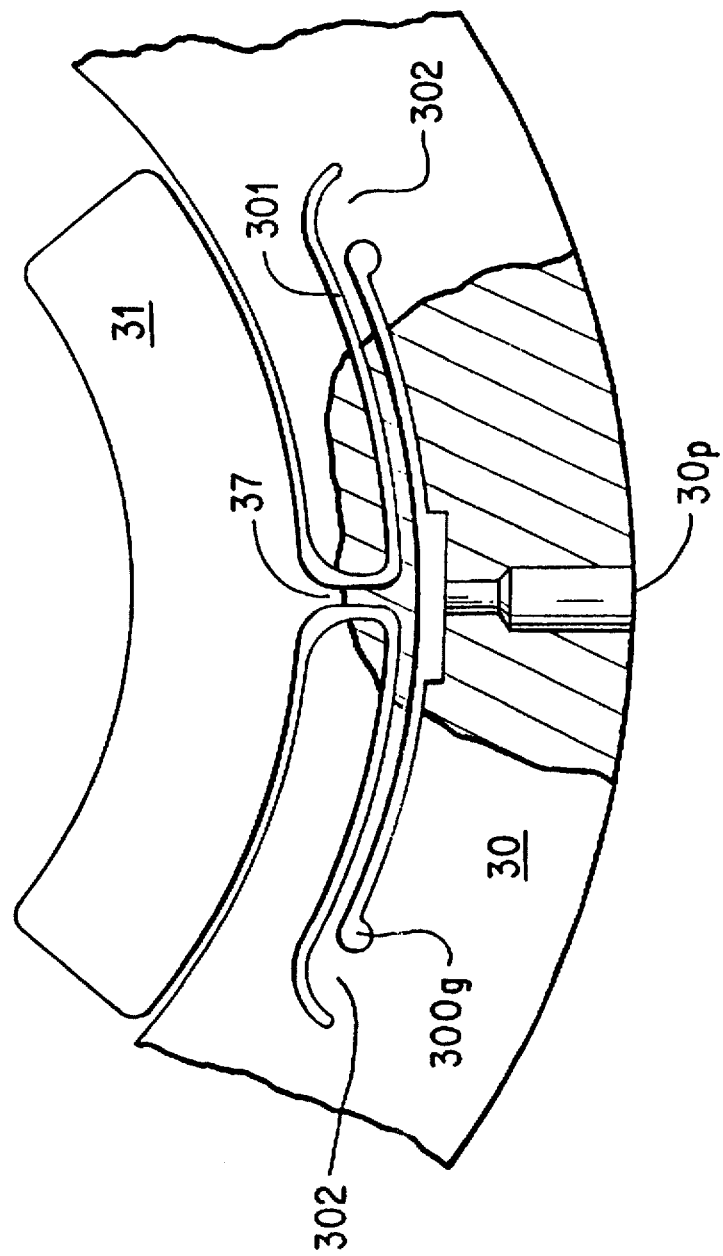
FIG. 17 is a detail view of a tilt pad bearing with active clearance and damping control.

FIG. 17 shows a bearing similar to that shown in FIG. 15, but including an active control device. Specifically, this embodiment includes a passage 30p formed through the base and in communication with the damping gap 300g. This allows active control of the supply and pressure of fluid to the damping gap 300g. By increasing the pressure of the fluid passing through the passage 30p into the damping gap 300g, the thin membrane 301 may be moved radially inward. Alternatively, by reducing the pressure of the fluid supply through the passage 30p into the damping gap 300g the membrane 301 is allowed to return to its static position. In this way, the fluid pressure supplied through the passage 30p can cause the bearing set or assembly clearance to be reduced thus providing better damping and centering capability. Consequently, the pre-load in the pad can be actively controlled in this manner.

Figure 18:
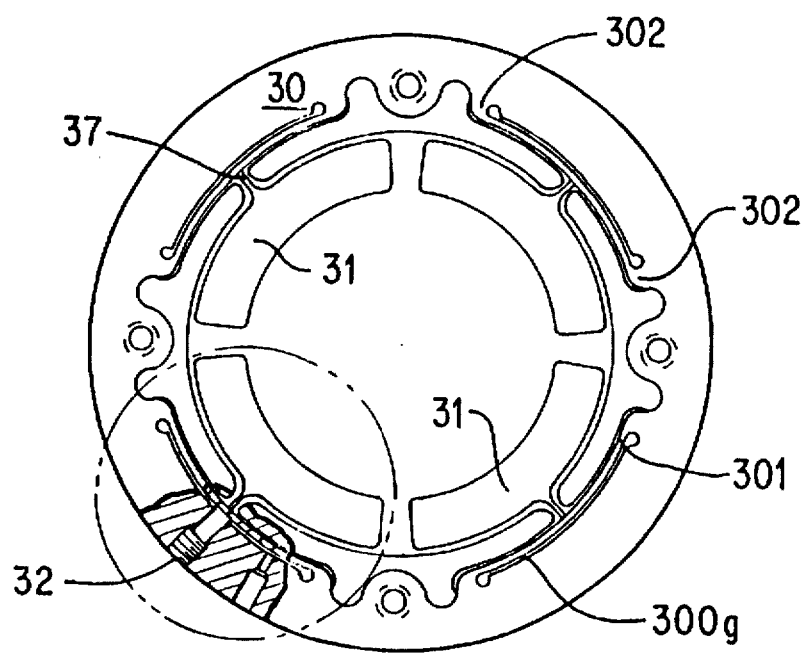
FIG. 18 is a side view of a tilt pad bearing similar to that of FIG. 17, but further including a limiting device.
Figure 18A:
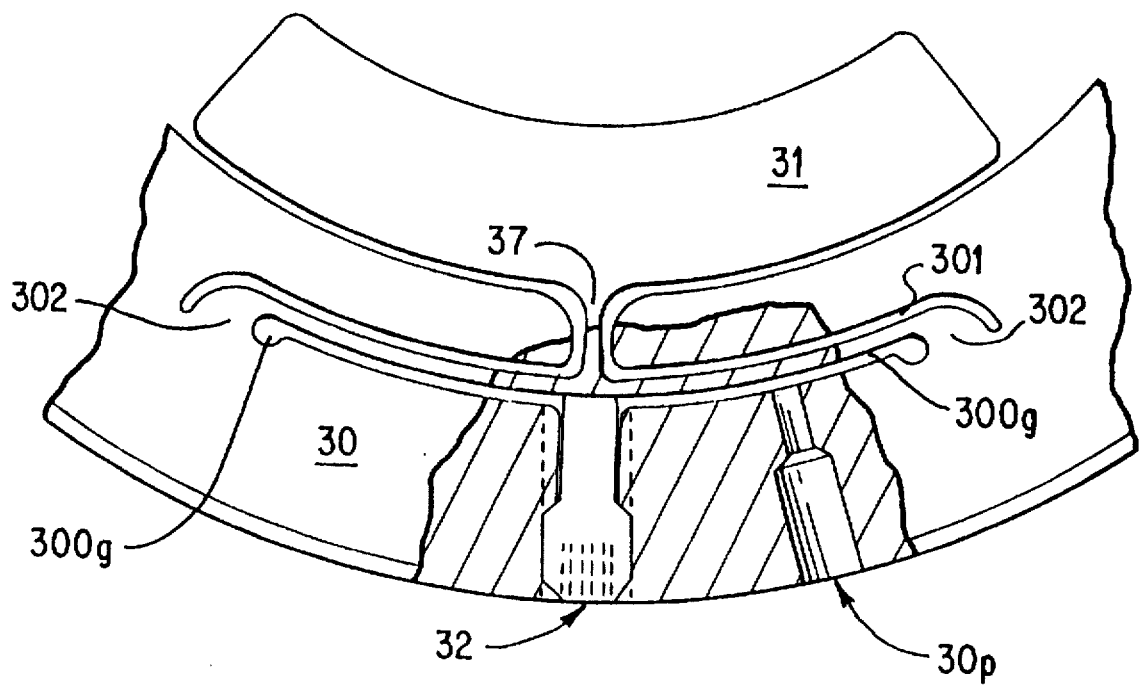
FIG. 18A is a detail view of the bearing of FIG. 18.

FIGS. 18 and 18A show a further modification of the bearing construction shown in FIG. 17 whereby the actively controlled bearing is provided with a limiting device to prevent a negative pre-load condition from occurring. This is, in fact, the currently preferred embodiment of the present invention. The embodiment shown in FIG. 18A is in all significant ways similar to that shown in FIG. 17 except that a limiting device in the form of a fine thread screw is provided in a manner similar to that shown in FIG. 16. To make room for the fine thread screw 32 the fluid delivery passage 30p is circumferentially offset as shown in FIG. 18. As with the embodiment of FIG. 17, the bearing shown in FIG. 18 can be actively controlled by varying the pressure of fluid supplied to the damping gap 300g through the fluid delivery passage 30p. The pressure can cause the bearing set or assembly clearance to be reduced thus providing better damping and centering capability. The pre-load in the pad can be actively controlled in this manner. Since the bearing has a limiting device in the form of fine threaded screw 32, it is possible to prevent a negative pre-load condition from occurring. Again, active control of bearing clearance allows the bearing to be operated through a wide range of temperatures. This is particularly well suited for cryogenic turbo expander applications in modern high performance, high efficiency turbo machinery.

By virtue of the design of the bearings shown in FIGS. 15–18A, it is possible to precisely control the pre-load and bearing side clearance and lightly loaded fluid film and gas bearings. The clearance can be adjusted after manufacturing to tune the bearing characteristics to the rotor being supported. Such adjustment is made, for example, through the fine thread screws 32 shown in FIGS. 16 and 18. The screw moves the pad inward changing the bearing clearance and pre-load.

Another variation of the tilting pad bearing construction shown in FIG. 1A is illustrated in connection with the embodiment of FIGS. 19 and 20. As shown, the tilting pad bearing has bearing pads 31, a housing 30 and webs 37 supporting each of the pads 31 on a single radially extending web 37 and is provided with directed lubrication. More specifically, and as shown in the drawings, a radially extending nozzle 30n is provided between each pair of adjacent pads 31. The nozzles 30n extend radially inward to a point which is only slightly outward of the surface of the pads 31. A radially extending lubricant passage 30p is formed in each nozzle 30n. In addition, the housing 30 is provided with an annular lubricant chamber 30c. As shown in the drawings, the passages 30p formed in each of the nozzles 30n are in communication with the annular lubricant chamber 30c.

Figure 20:
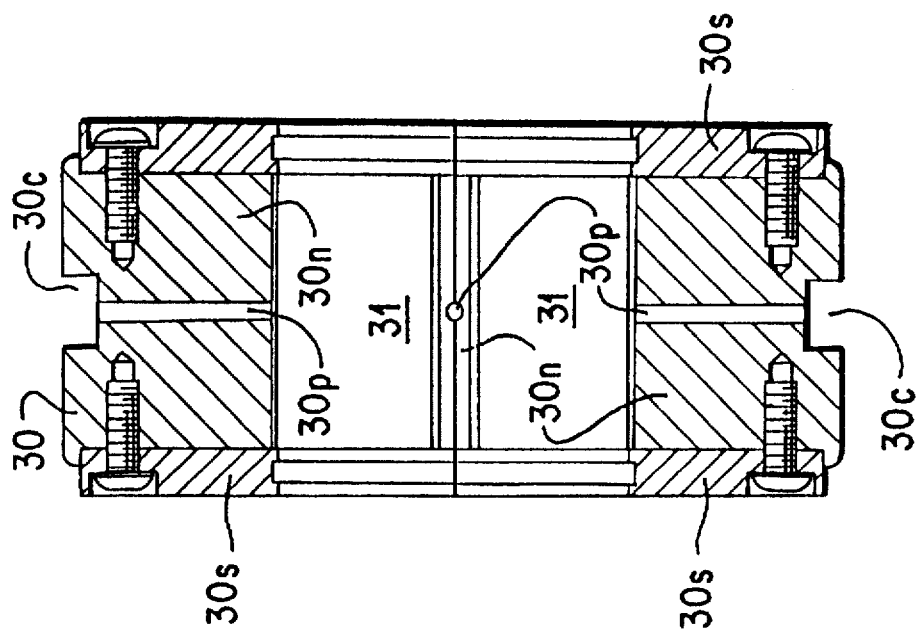
FIG. 20 is an axial section of the bearing of FIG. 19 along the lines indicated in FIG. 19.

As best shown in FIG. 20, the axial ends of the bearing assembly are sealed such as by end seals 30s which are secured to the housing 30 by screws. Again, however, the primary constituent parts of the bearing, i.e., the pad supports 37, housing 30 and nozzles 30n are integrally formed as a single piece. In operation, the nozzles 30n are used for directed lubrication, i.e., directing lubricant to the leading edge of the bearing pads. Lubricant provided in the annular lubricant chamber 30c under pressure will be forced through the passages 30p into an area immediately adjacent the leading edge of each of the pads 31. Since the nozzles are integral with the bearing, any possibility of the nozzles 30n becoming loose and interfering with the pad operation or contacting the shaft supported by the pads is eliminated.

Figure 19:
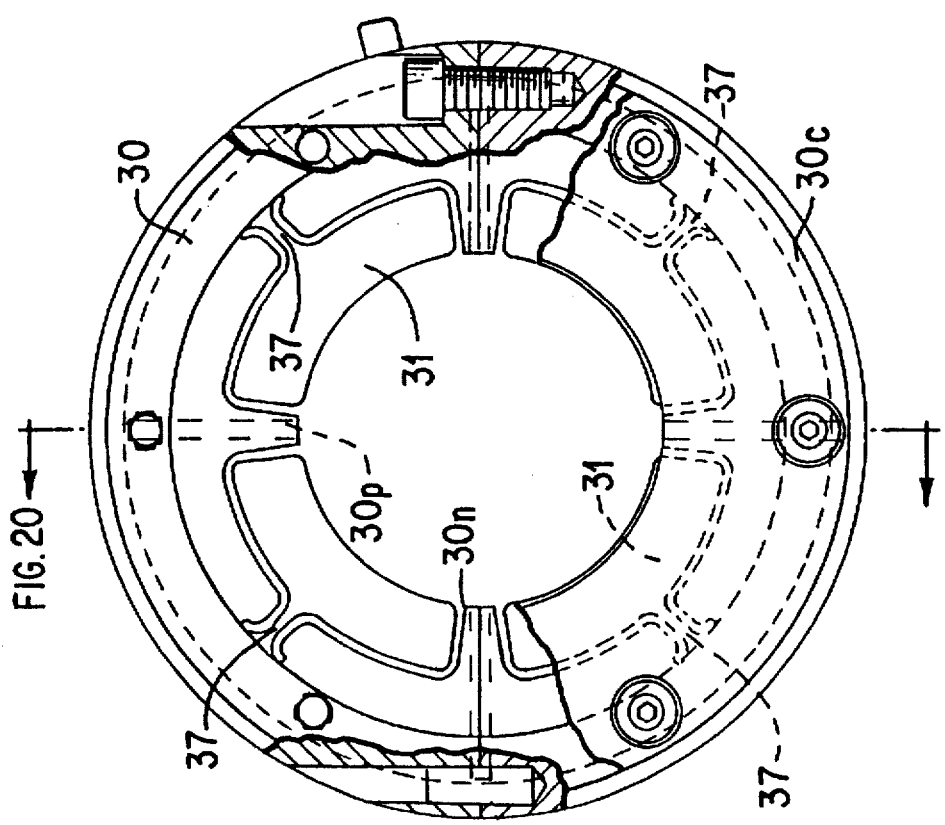
FIG. 19 is a side view, partially in section, of a tilting pad bearing with directed lubrication.

By supplying directed lubrication, the thin gap between the pad and housing formed by a cut (as best shown in FIG. 19) provides damping. This will eliminate any pad flutter problems as is evident from the drawings. Again, the cut may be formed by electrodischarge machining or any other technique for producing sufficiently thin gaps.

In the embodiment of FIGS. 19 and 20, the housing 30 is shown as constructed from two separate housing halves. In certain instances, this simplifies assembly over long shafts or under other circumstances where it is not desirable to slip the shaft into the bearing. Even with the split assembly of FIGS. 19 and 20, however, the pads 31 support webs 37 and housing 30 are integral. Such an axially split construction is particularly advantageous in a modular construction of the type shown in FIGS. 21 and 22 and described below since it allows easy access to the interior of the bearing to facilitate assembly.

Any of the bearing pad configurations disclosed herein can, if desired, be used as part of a modular system. This is done by, for example, forming the pad portion and the support structure as separate connectable pieces and/or providing a means for releasably securing the support structure to the carrier or housing. Specifically, in the bearing pads described herein, the pad portion may be formed separately from the support portion and provided with a connector which cooperates with a complementary connector in the support portion to releasably or non-releasably secure the pad portion to the support portion during manufacture to form a bearing pad.

In the embodiment illustrated in FIGS. 21–24, (discussed below) for example, the connector is in the form of a thread formed on the upper end of the support post 37p. A complimentary threaded bore or screw receiving portion is formed in the pad 31. Thus, the pad 31 can be releasably screwed onto the support post 37p to form a bearing pad supported on a single post. Naturally, any known complementary connectors can be employed to connect the pad or ligament portion to the support portion. Moreover, the pad may be either releasably secured, i.e., secured in a manner which enables repeated release and re-securing in a normal manner, or non-releasably secured to the pad portion. For instance, the pad may be press fit onto the support portion; the pad may be cam-locked onto the support portion (non-releasable); the pad may be keyed onto the support portion (releasable); the pad may be snap fit onto the pad (generally non-releasable). When a polymeric or rubber pad portion is desired, it may be molded or otherwise formed directly on the support structure.

Forming the pad and the support post or ligament or other support structure separately offers considerable advantages over previously known unitary constructions. For example, different pad portions may be associated with any particular support portion so that standard pad portions and standard support portions may be combined to provide a wide variety of bearing pads suitable for use in numerous applications. Thus, through the provision of a predetermined number X of standard bearing pad portions and a predetermined number Y of standard support portions, X times Y variations of bearing pads can be constructed. Accordingly, virtually any desired performance characteristic can be obtained. The versatility of the modular system can be further increased through the use of spring-like beam mounted housings as discussed below. These housings may also be fluid dampened.

The standard pad portions and support portions can be varied according to shape, material and size to yield desired performance characteristics. For example, the pads can be formed of polymeric materials, metal, ceramic or composites. The shape of the pads will normally be dictated by manufacturing and performance considerations. Manufacture of any desired shape is made easier when the pads are formed separately. For example, the pads can be stamped or molded even when the entire bearing cannot be molded. The currently preferred configurations are shown in the drawings.

Figure 22:
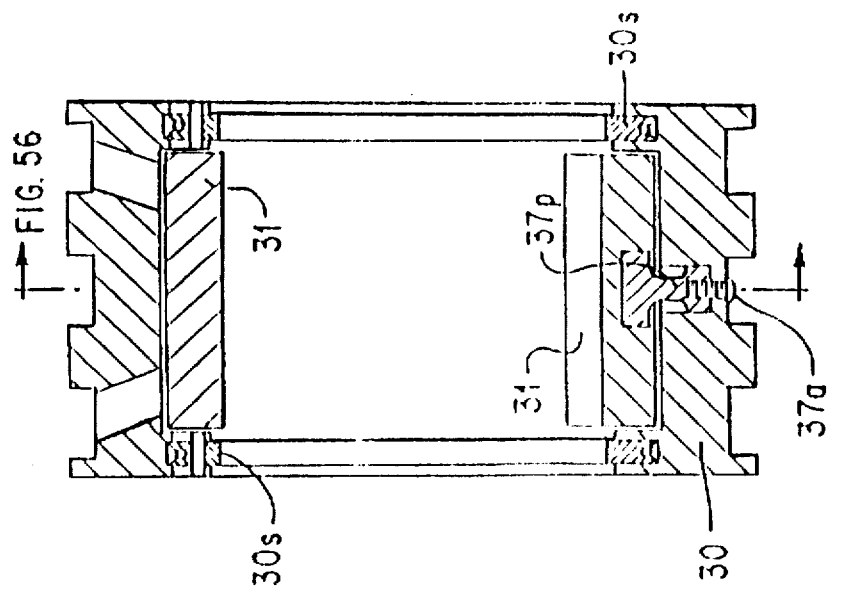
FIG. 22 is an axial section along the lines indicated in FIG. 21.
Figure 21:
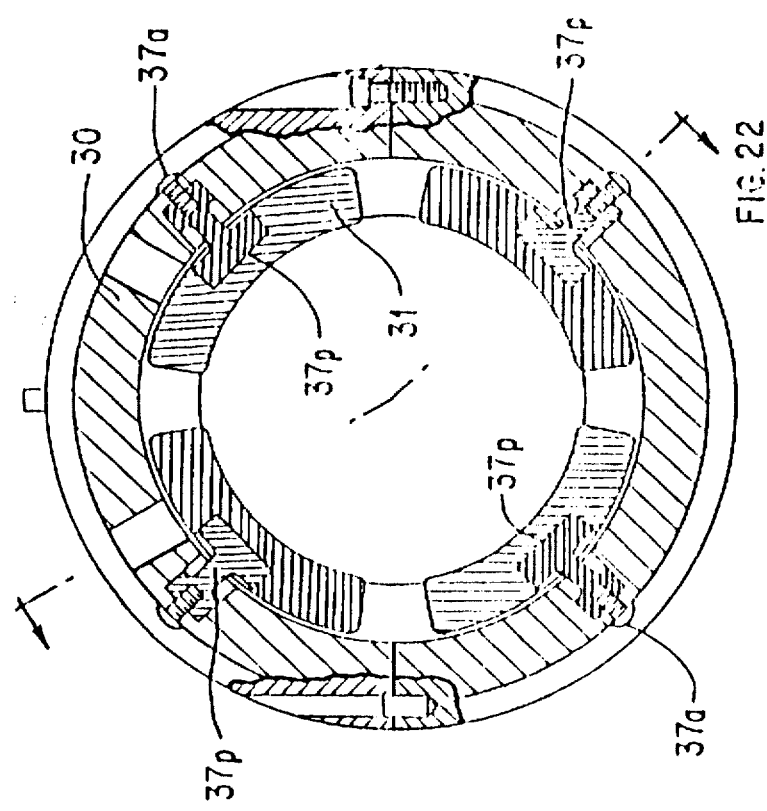
FIG. 21 is a side section with sectional details of a tilting pad bearing in which the ligament or support is modular and not integral with the pad.

One form of modular tilting pad construction is shown in FIGS. 21 and 22. As shown in this embodiment, the bearing again includes pads 31 supported on a housing 30 by a single radially extending member. In this case, however, the support is in the form of a post 37p which is modular and not integral with the pad 31. This post design allows interchangeability of support posts in the field. Moreover, this design permits the use of softer and weaker pad material while at the same time using a strong high endurance limit steel post 37p for support. The post may be of any shape or may be circular, consequently, the post can flex in both the circumferential and axial directions, if desired. More specifically, the post 37p can flex along the circumferential direction as with the ligaments 37 previously described to provide better stability. In addition, the post 37p can flex axially to provide better alignment with the shaft supported.

Figure 24:
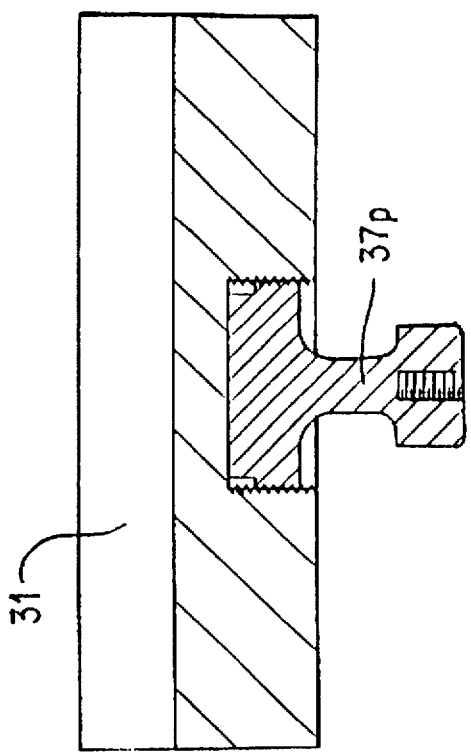
FIG. 24 is an axial section of the pad and support of FIG. 23 as shown.
Figure 23:
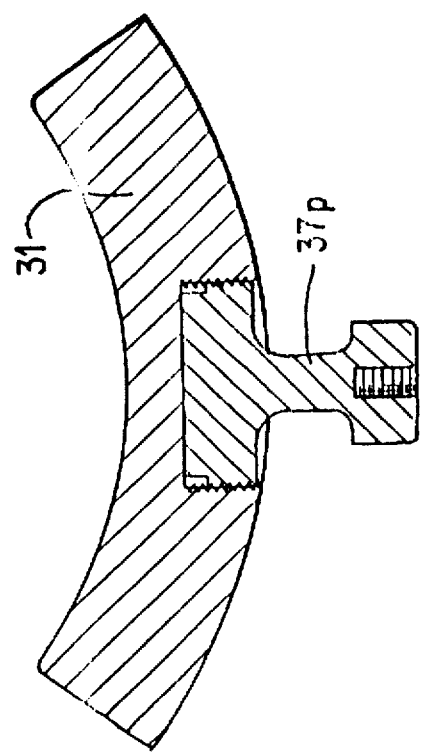
FIG. 23 is a detailed view of a side section of a pad and support for use in the bearing of FIG. 21.

FIGS. 23 and 24 illustrate the connection of the post 37p to the pads 31. As indicated therein, the post 37p may be threaded into the pads as shown. Naturally, other forms of detachable and locking connections may be used. As best shown in FIGS. 21 and 22, the post 37p may be secured to the housing by an adjusting screw 37a.

Although the bearings described heretofore have been hydrodynamic, the performance of the bearings could be improved, in certain applications, by providing hydrostatic lift. The bearings of the present invention can be modified to provide hydrostatic lift. This is discussed further in connection with FIGS. 25-30.

Figure 26:
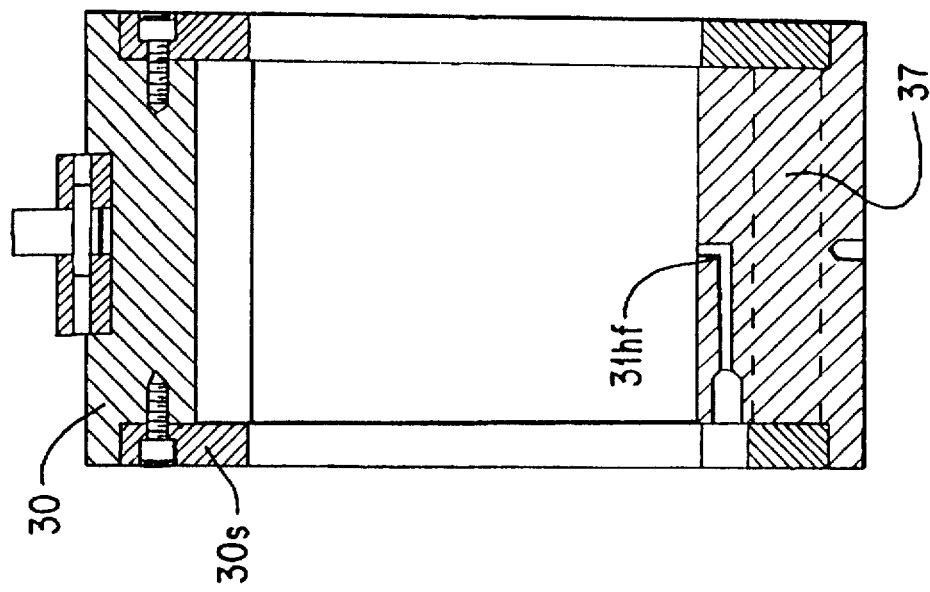
FIG. 26 is an axial section along the lines indicated in FIG. 25.
Figure 25:
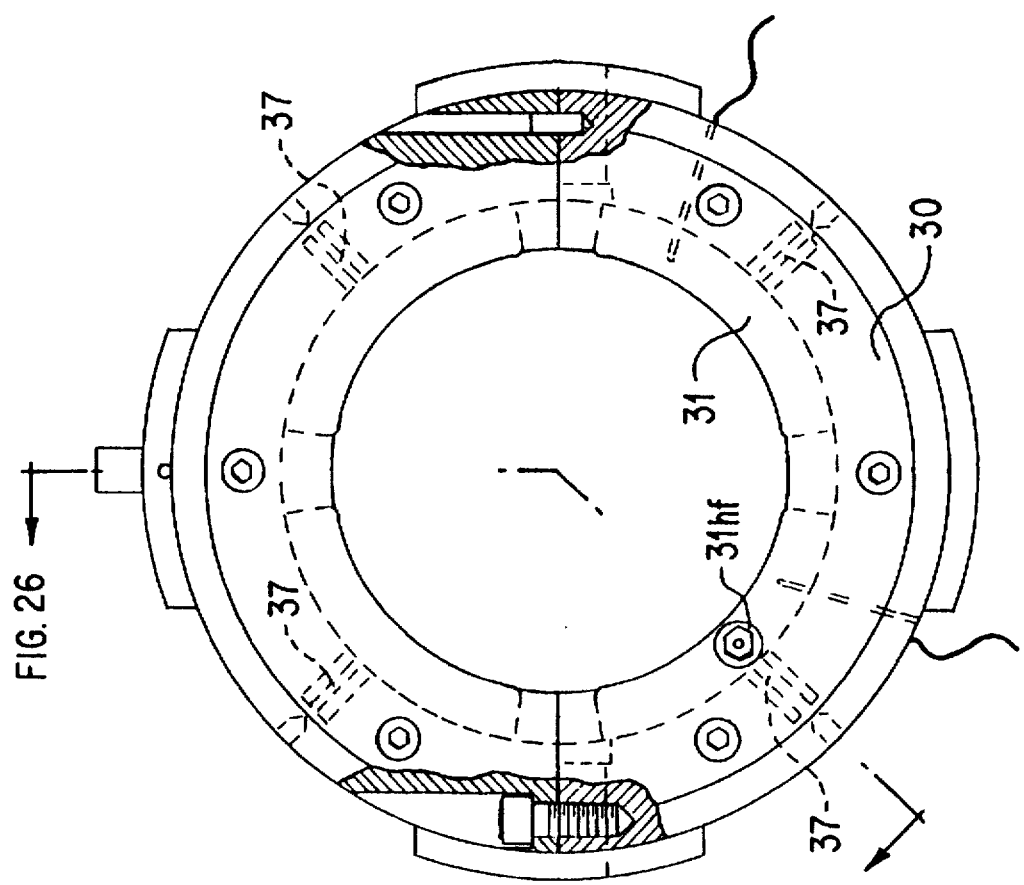
FIG. 25 is a side view, partially in section, of a tilting pad bearing with hydrostatic lift.

In the embodiment shown in FIGS. 25 and 26 a tilting pad bearing similar to that shown in FIG. 1A is provided with hydrostatic lift. Again, the bearing includes a plurality of circumferentially spaced pads 31 supported on a housing 30 by thin webs 37. Again, the housing 30 may be axially split as shown if desired.

The bearing is provided with hydrostatic lift by supplying pressurized fluid to a central, preferably recessed, region of the pad 31. The attachment of the pads 37 to the housing 30 by single web 37 simplifies delivery of the hydrostatic fluid to the pad surface. In particular, there is no need for high pressure flexible tubing with this type of bearing. The hydrostatic feed 31hf can be directed to the side of the pad as shown in FIGS. 25 and 26 or through the post 37p or web 37 shown in FIGS. 27, 28, 29 and 30.

Figure 27:
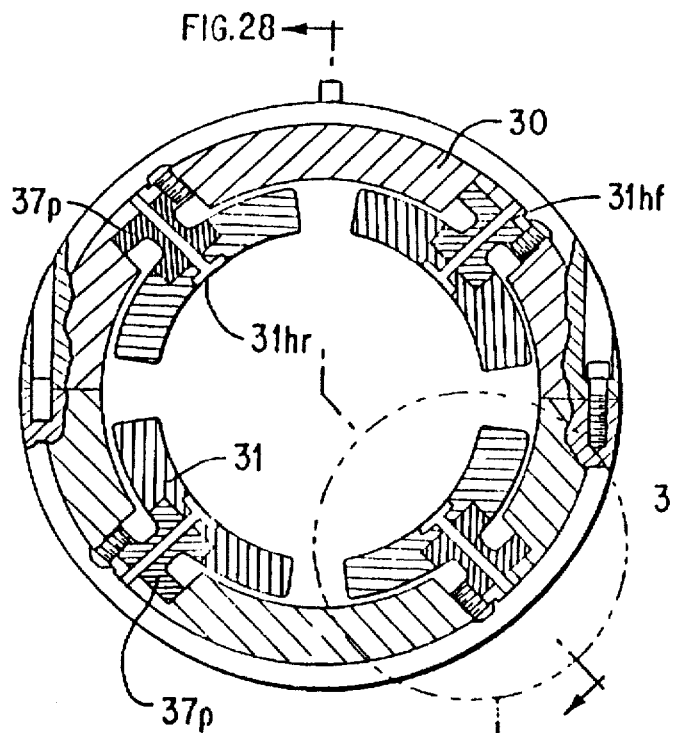
FIG. 27 is a side section with additional sectional detail of another tilting pad bearing with hydrostatic lift capabilities.
Figure 28:
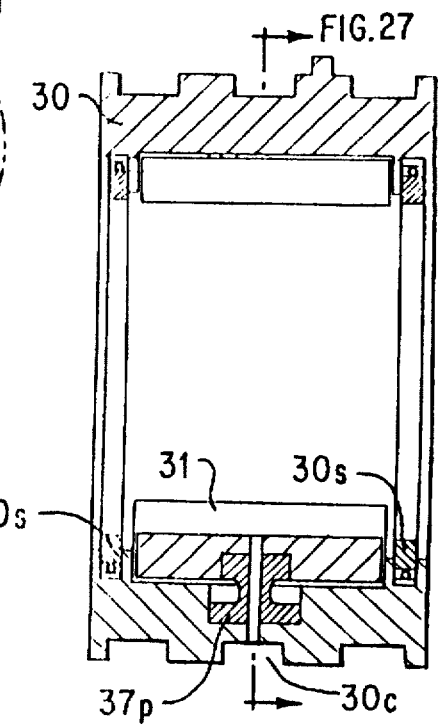
FIG. 28 is an axial section along the lines indicated in FIG. 27.
Figure 29:
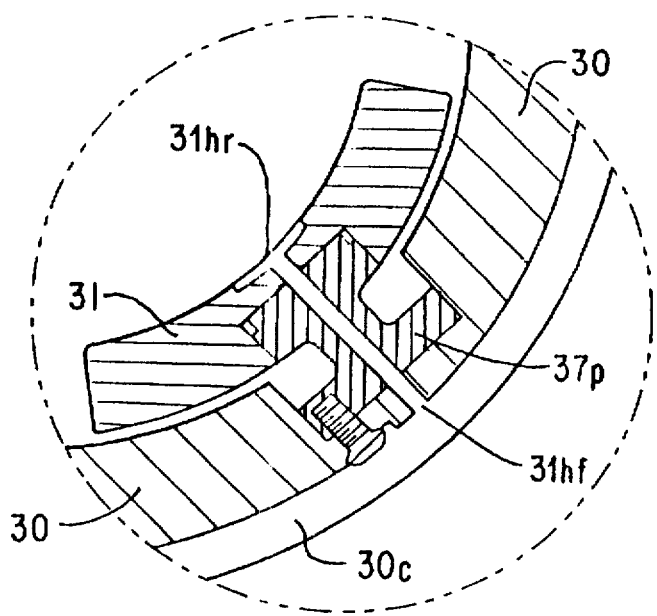
FIG. 29 is a detailed view of FIG. 27 as indicated.

FIGS. 27-29 depict another embodiment of a tilting pad bearing which is also capable of hydrostatic lift. The bearing shown is very similar to that shown in FIGS. 21-24, except for the provision of a hydrostatic feed passage 31hf extending through the support post 37p and the pad 31. As best shown in FIG. 29, the hydrostatic feed 31hf extends virtually radially through the center of the support post 37p and terminates in an expanded hydrostatic recess 31hr formed on the surface of the pad 31. The end of the hydrostatic feed 31hf which is opposite the hydrostatic recess 31hr is in fluid communication with an annular fluid channel 30c. In operation, a supply of pressurized hydrostatic fluid is provided to each of the circumferentially spaced hydrostatic feeds 31hf through the annular channel 30c. The pressurized fluid flows through the hydrostatic fluid 31hf to the hydrostatic recess 31hr so as to provide a hydrostatic lift in conjunction with the bearing operation. The screw which connects the post 37p to the housing 30 is offset and the base of the post is expanded since the hydrostatic feed 31hf in the embodiment shown passes through the center of the post 37p.

Figure 30:
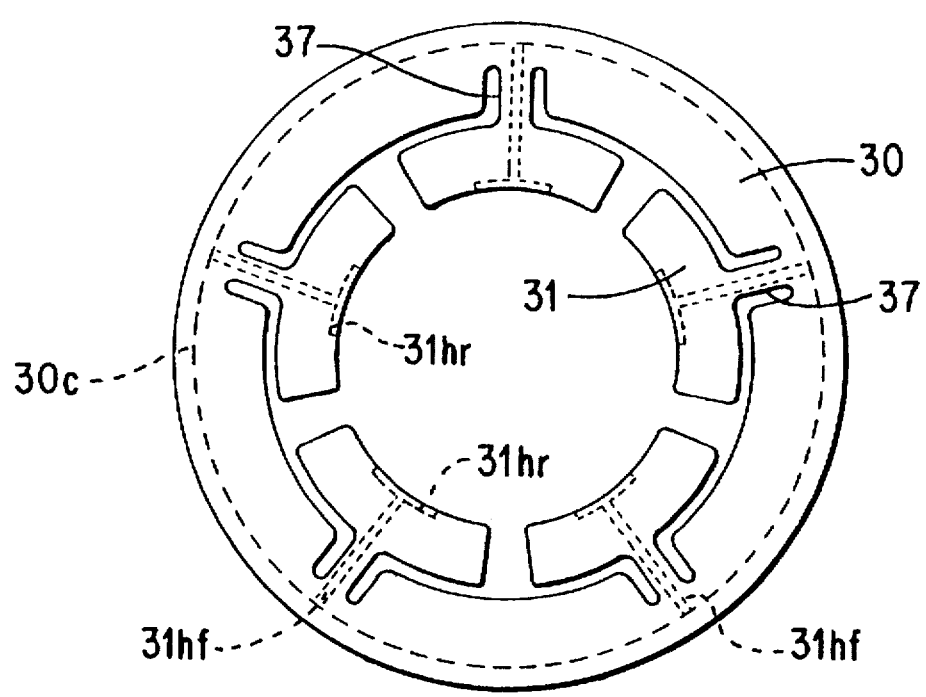
FIG. 30 is a side view of an integral one-piece tilting pad bearing with hydrostatic lift.

FIG. 30 shows another embodiment of a hydrostatic bearing according to the present invention. In this embodiment, the bearing pads 31 support ligaments 37 and housing 30 are integrally formed as a single piece. Except for this, the construction shown in FIG. 30 is similar to that shown in FIGS. 27-29. Specifically, a hydrostatic feed 31hf extends radially through each support ligament 37 to provide fluid communication between an annular channel 30c and a hydrostatic recess 31hr which is formed in the pad surface of each of the space bearing pads 31.

In any of the bearings of the present invention which are modified to provide hydrostatic lift, the basic principle of hydrostatic lift is to introduce a pressure resistance film of fluid between the pad and shaft surface to prevent direct contact between the two surfaces. In order to achieve hydrostatic effects, it is desirable to provide an expanded hydrostatic recess 31hr shown in FIGS. 27-30. This is because total hydrostatic force is a function of both the pressure and the area over which that fluid pressure acts. The hydrostatic force which acts against the shaft is increased by providing a larger surface area which is subject to the fluid pressure. As is readily evident, the provision of a hydrostatic recess increases the surface area over which the high pressure fluid acts and thus increases the total hydrostatic force.

Finally, it is expected that for some applications it will be beneficial to combine the hydrostatic and damping features of the present invention. This can be done by providing a damping gap or cavity in combination with a hydrostatic feed and recess. This will enable the bearing to absorb shock type loading.

The bearings of the present invention have thus far been described herein in connection with what is believed to be the best mode of use of the presently claimed invention, i.e., cryogenic applications. The invention is not, however, limited to use in such applications. To the contrary, the invention is applicable to other hydrostatic bearing applications and other applications where active control of bearing clearances and fluid damping are helpful.

FIG. 1B illustrates another tilt-pad bearing according to the present invention. This bearing construction is similar to that shown in FIG. 1A with few exceptions. First, the webs 37 are circumferentially offset so that the bearing is, in effect, designed to support the shaft for rotation in only one direction. Because the support is different for each direction of rotation, the tilting characteristics of the pad will vary and will only operate properly in one direction. The bearings shown in FIG. 1B includes six circumferentially spaced bearing pads 31. Again, each of the pads are supported on a single radially extending thin web 37. The webs are supported on a bearing housing 30. Once again, it is critical that the webs 37 are thick enough to avoid tilting stress, but thin enough such that the pads tilt as tilt-pads rather than as fixed geometry pads. As shown, the ligaments have a length which exceeds their circumferential width. In the embodiment illustrated in FIG. 1B, the bearing housing 30 is provided with radially extending oil lubricating passages 30o to allow the lubricant to flow into a bearing housing. The oil lubricating passages 300 are preferably located between adjacent pads as shown in FIG. 1B.

In accordance with another aspect of the present invention, tapered thrust lands 31T are provided on the bearing housing 30 to carry small thrust loads incurred during operation. This might be necessary, for example, when the bearing is used in a planetary gear arrangement wherein small thrust loads are incurred in positioning the planet gear shaft. The thrust loads 31 should, preferably, be circumferentially spaced along the bearing. Like the embodiment of FIG. 1A, the embodiment of FIG. 1B includes simple pivoting-type webs. Again, however, the support structure could be modified to provide additional flexibility as discussed herein.

Referring now to FIGS. 2, 2A and 3, the structure therein illustrated is a sector of a journal bearing assembly having grooves and slits formed therein so as to define a housing 10 and a plurality of circumferentially arranged bearing pads 12 each of which is supported by a support structure which includes the housing, a beam 14 and a stub section 16. The bearing is not symmetrical about the pad circumferential center line 13a (FIG. 3).

Accordingly, the bearing illustrated is a radial unidirectional bearing, i.e., it is adapted for radially supporting a shaft for rotation in only one direction. In the illustrated embodiment, the bearing supports the shaft 5 only for rotation in the counter-clockwise direction illustrated by the arrow. On the other hand, if the bearing were symmetrical about the center line of the pad would be capable of supporting the shaft 5 for either clockwise or counter clockwise rotation, i.e., the bearing would be bi-directional.

Each bearing pad 12 includes a leading edge 15 and a trailing edge 17. The leading edge is defined as the edge first approached by a point on the circumference of the shaft as it continues to rotate. Similarly, the trailing edge is defined as the edge approached circumferentially later by the same point on the shaft as it continues to rotate. When the shaft 5 is rotating in the proper direction, it moves, on a fluid film, from the leading edge across the bearing pad and off the trailing edge. Optimum performance is obtained when the stub-section 16 supports the bearing pad 12 and hence any load, at a point 16a (FIG. 3) between the circumferential center line 13a of the pad 12 and the trailing edge 17, preferably closer to the center line 13a. The beam 14 should also pivot about a point 14a which is located angularly between the leading edge and the trailing edge so that as a result of deflection of the beam 14, the trailing edge 17 deflects inwardly. Of course, the degree of deflection depends on, among other things, the shape of the beam and the length of the cuts or slits formed in the bearing.

Referring now to FIGS. 2 and 3, it will be seen that the pad 12 is provided with an accurate face 13 which corresponds essentially to the radius or arc of the outer diameter of the shaft which the pad will be supporting (via the fluid film) and each pad is defined by axially extending and radially extending edges. The axially extending edges comprise the leading and trailing edges. The beam is shown both in a static position (solid lines) and in a deflected position (phantom lines) in FIG. 3. The basic construction of the support structure as illustrated in FIG. 1, is created by the use of small slits or cuts through the wall. Typically these slits or radial cuts are between 0.002" to 0.125" wide. The degree of deflection can be varied by varying, among other things, the length of the cuts. Longer cuts provide a longer moment arm which yields greater deflection. Shorter cuts yield beams having less flexibility and higher load carrying ability. In selecting a length of cut or slit, care must be taken to avoid resonance.

By locating the end of beam 14 as shown, the deflection downward about the connection point 16a will result in inward movement of the trailing edge 17 of the pad 12, outward movement of the leading edge 15 and a slight flattening of the pad 12 as seen in the dotted lines of FIG. 9. As a result of this deflection, the gap between the pad face 13 and the outer surface of the shaft 5, through which fluid flows, becomes wedge shaped to yield the well-known hydrodynamic support effect.

Ideally the ratio of the spacing between the trailing edge and the shaft versus the spacing between the leading edge and shaft is between 1:2 to 1:5. In other words, the spacing between the leading edge and shaft should be between 2 to 5 times greater than the spacing between the trailing edge and the shaft. In order to attain this ideal spacing or wedge ratio for any specific application, appropriate deflection variables including number, size, location, shape and material characteristics of the unitary element must be selected. A computer aided finite element analysis has proven to be the most efficacious means of optimizing these variables. Computer aided analysis is particularly useful in a bearing such as the type described above which permits movement in all six directions (six degrees of freedom).

The most important consideration in the performance of a hydrodynamic bearing is the shape of the space, typically a converging wedge, between the rotating shaft to be supported and the bearing pad surface. Since the shape of the shaft surface to be supported is basically invariable, it follows that the most important consideration in the design of hydrodynamic bearings is the shape of the pad surface under load. The shape of the pad surface under load principally depends upon two factors: the shape of the pad itself and the construction and location of the pad support structure. For purposes of this description, the various support structure designs will be discussed first followed by a discussion of various pad designs. It must be emphasized that the various support structures disclosed herein can be used with any of the pad shapes disclosed herein and the pad-shapes used herein can be used with any of the support structures disclosed herein.

Referring to FIGS. 4 and 5, there is shown a second illustrative example of a bearing incorporating features of the present invention in which the bearing is formed with slits or cuts and grooves to define a bearing housing 30 with a bearing pad 32 that is supported from the housing by a support structure which includes a beam having a pair of beam portions 34a, 34b which extend substantially in a single line away from the pad. Moreover, the pad may be undercut so that it is supported by the beams only on a pad support surface 34ps. Referring to FIG. 5, it will be seen that the beams 34, 34a have a convenient stub beam end as is 36, 36a which acts as a cantilever support for the beam.

As is evident from FIG. 4, the perspective view of FIG. 5 shows only a portion of the pad 32. The complete pad is illustrated in FIGS. 5A and 5B which show possible modifications of the bearings illustrated in FIG. 4. As is clear from the drawings, the pad support surface 34ps is located closer to the trailing edge 37 than the leading edge 35. With this construction, twisting of the beam, as illustrated in FIG. 7, will take place intermediate the beam and create the torsional deflection illustrated. Again the primary flexibility is developed by small cuts or slits through the bearing housing wall. These cuts provide the bearing pad with six degrees of freedom (i.e., the pad can translate in the +x,−x, +y,−y, +z and −z directions as well rotate about the x, y and z axes) and are designed to optimize hydrodynamic wedge formation. If the cuts or slits were terminated before breaking through to form beam portions 34a and 34b, the pad 32 would be supported by a continuous cylindrical membrane 34m as shown in FIG. 5A. The membrane acts as a fluid damper upon which the pad 32 is supported. The termination of the cuts would occur at Point A and Point B of FIG. 4. The flexibility of the membrane, combined with the fluid lubricant, provides a means to vary the damping action and to isolate the pad from the housing. The damping takes the form of a dash pot that exhibits high damping characteristics.

As shown in FIG. 5B, the beam may be defined more simply than shown in FIG. 5 by simply extending the cuts or slits downward from points A and B.

In such a case, the bearing is supported for simple flexural rotation, i.e., on a single radially extending beam. As noted earlier, such a construction is well suited for certain applications. It should be noted that with such a construction, the beam is slightly longer in the radial direction than it is wide, to ensure sufficient flexibility.

Referring to FIG. 8, there is shown another illustrative example of a bearing incorporating features of the present invention. In this example, internal slits or cuts are provided to create a beam on beam support structure. Specifically, the bearing is formed with grooves and slits or cuts to define a pad 40 which is supported from a housing by beams 42 and 44. The pad is connected to the beams at support stubs 40a and 40b. Beam attachment to the housing is at support stubs 46 and 48. Again the bearing consists of the thin cuts or slits shown cut through the bearing wall. The cut or slit 60 below the pad surface introduces additional flexibility such that under load the pad changes shape to form an airfoil for the introduction of lubricant. Thus, as a result of the beam on beam two point support, the pad acts as a spring like membrane.

FIG. 10A shows the deflected shape of the pad 40 under load. As shown in the drawings (exaggerated), the pad can be formed and supported so as to deflect to an airfoil shape under load. The airfoil dramatically improves performance. As is evident from the drawings, the pad is capable of displacement in the x, y, and z directions as well as rotation about the x, y, and z axes, that is, the pad has six degrees of freedom. Again, the structure allows optimal hydrodynamic wedge formation.

Referring to FIG. 9, there is shown the local inherent deflection of the face pad 50 where the pad flattens under load. These deflections are combined with the support structure deflection shown in FIGS. 3 and 10 but are of a lower magnitude. The net result is the shape shown in FIGS. 3 and 10 but with a face curvature that has been minutely flattened.

FIGS. 31 and 31A illustrate another example of a journal bearing in accordance with the present invention. The bearing construction illustrated in FIGS. 31 and 31A differs from the previously described journal bearing constructions in that the bearing is bi-directional, i.e., the bearing is capable of supporting a shaft for either clockwise or counterclockwise rotation as viewed in FIG. 31. The bearing is bi-directional because the pads are symmetrical about their center line, which is defined as the radial extending line passing through the bearing major axis (606) and the geometric center of the pad. Like the previously described journal bearings, the bearing of FIGS. 31 and 31A is formed with a plurality of thin radial and circumferential slits to define a plurality of circumferentially spaced bearing pads 632.

The support structure for each of the bearings pads 632 is somewhat similar to the support structure for the journal bearing illustrated in FIG. 8. In particular, each bearing pad 632 is supported by a beam support structure at two pad support surfaces 632ps. The beam network connected to the bearing pads at each pad support surface 632ps is identical, yielding the symmetrical construction of the bearing which makes the bearing bi-directional. For purposes of simplifying this description, only the network of beams which supports the bearing at one pad support surface will be described since the other pad support surface is supported in an identical fashion. Thus, as shown in FIG. 31, a first, generally radially extending beam 640 is connected to the bearing pad 632 at the pad support surface 632ps. A second, generally circumferential beam 642 is connected to the radially outermost end of beam 640. A third, generally radial, beam 644 extends radially inward from the beam 642. A fourth, generally circumferential beam 646 extends from the radially innermost portion of the beam 644. A fifth, generally radial beam 648 extends radially outwardly from a beam 644 to the housing portion of the support structure. In summary, each bearing pad 632 and the bearing illustrated in FIG. 31 is supported by ten beams and the bearing housing. Further, as discussed below, by forming radially extending circumferentially spaced grooves or continuously extending circumferential grooves in the housing portion of the support structure, the housing portion of the support structure can be designed to act as a plurality of beams or membranes. It should also be noted that, like the bearing in FIG. 8, the cut or slit formed below the pad's surface introduces additional flexibility such that under load the pad changes shape to form an airfoil for the introduction of lubricant. Thus, as a result of the beam on beam two point support, the pad acts like a spring-like membrane.

FIG. 31A is a radial cross-section of FIG. 31 showing the third beam 644, the bearing pad 632 and the housing.

Figure 32B:
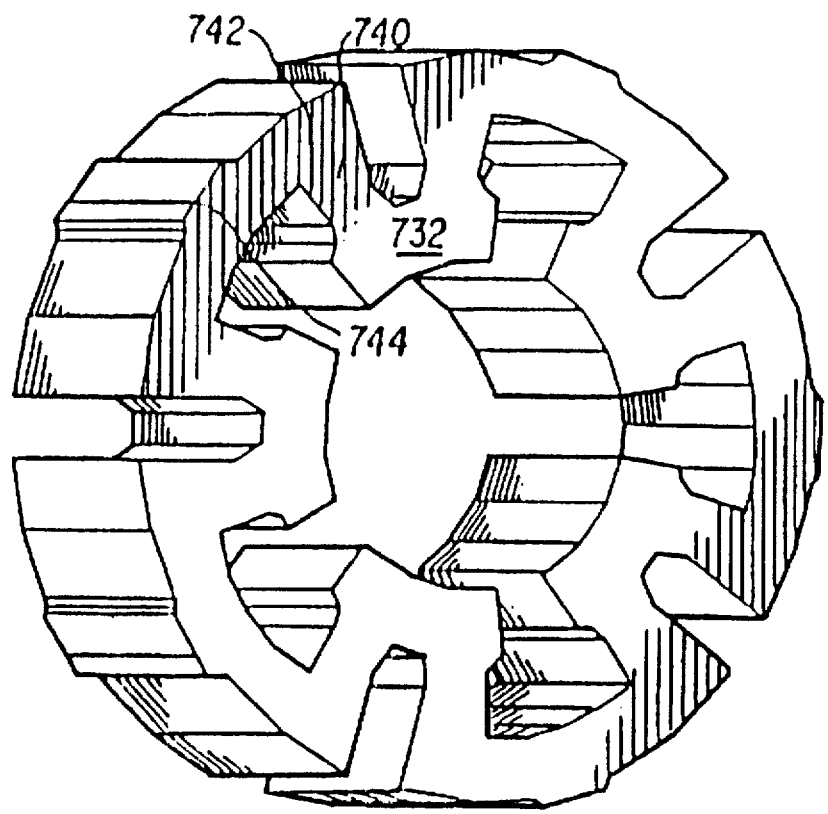
FIG. 32B is a perspective view of the bearing of FIG. 32.

FIGS. 32, 32A and 32B illustrate another journal bearing construction in accordance with the present invention. This bearing construction differs from the previously described bearing constructions in that the bearing pads and support structure are defined by relatively large grooves and openings formed in a cylindrical blank. Normally, this type of construction would be formed by milling the blank rather than electrical discharge machining or some other similar technique for forming small grooves as with the previously described embodiments. An advantage of the bearing construction illustrated in FIG. 32 is that in applications requiring extremely small bearings it is easier to form precisely the proportionately larger cuts and openings required to form a bearing of the type illustrated in FIGS. 32, 32A and 32B as compared to the proportionately smaller cuts and openings required by the construction of, for example, FIGS. 1, and 8. Moreover, the large grooves or openings are generally easier to mold or extrude bearings formed by larger cuts also find use in applications requiring extremely large bearings with stiff bearing pad support structures.

The bearing pads shown in FIG. 32 are symmetrical about their pad center line, 706A. Hence, the bearing is bi-directional. Moreover, as best shown in the perspective view of FIG. 32B, the bearing has a continuous cross-section with no hidden openings. Hence, it is easily extrudable and easily moldable. Naturally, the support structure can be altered by providing discontinuities in the cross-section, e.g., by providing radially extending circumferential grooves or non-symmetrically disposed radially extending openings to alter the support structure and thereby alter the performance characteristics. The bearing's major axis is 706.

As shown in FIG. 32, the bearing includes a plurality of circumferentially spaced bearing pads 732. Each bearing pad 732 is supported by a support structure which includes a pair of generally radial beams 740 connected to the bearing pad 732 at a pad support surface. A second, generally circumferentially extending beam 742 supports each of the beams 740. Beams 742 are connected to the housing or support stubs 744 in a cantilever type fashion. In this bearing, the beams 740 can be regarded as a primary support structure; the beams 742 can be regarded as a secondary support structure; and the beams 744 can be regarded as a tertiary support structure.

The second beams 742 shown in FIG. 32 are defined by forming a plurality of axially extending circumferential grooves 750 in the housing of the support structure. In order to maintain the symmetry of the bi-directional bearing, these grooves are circumferentially spaced about pad center lines 706A in a manner identical to the circumferential spacing of the bearing pads 732. Naturally, similar circumferentially spaced radial grooves could be provided in any of the previous bearing constructions. For instance, as noted above, such grooves could be formed in the periphery of the bearing construction illustrated in FIGS. 31 and 31A to provide a further beam-like support.

FIG. 32A is a radial cross-section of a portion of the bearing illustrated in FIG. 32. In this cross-section, the bearing pad 732 and first beam 740 are visible.

FIG. 32B is a perspective view of the bearing of FIG. 32. It should be noted that although the peripheral, circumferential and cylindrical portions of the bearing are depicted in a somewhat segmented fashion to emphasize the curvature, these curved surfaces are in fact continuously curved.

Figure 33:
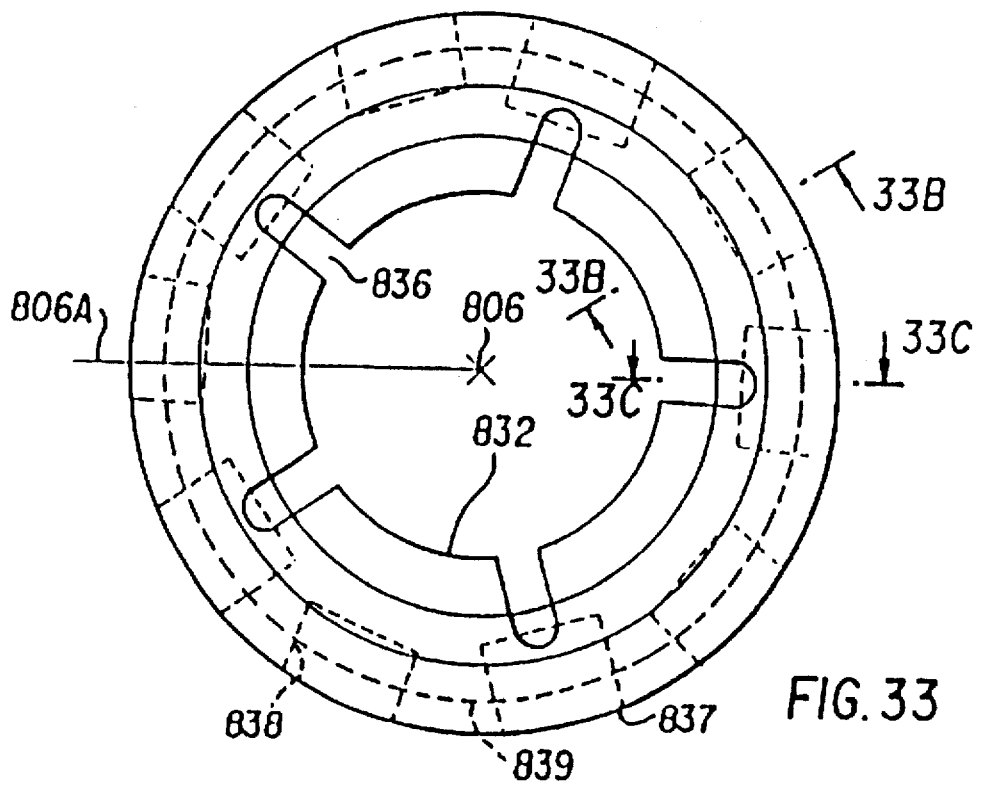
FIG. 33 is a side view of another journal bearing construction in accordance with the present invention.

FIG. 33 illustrates a journal bearing construction according to the present invention. Like the bearing of FIG. 32, the bearing of FIG. 33 is formed by proportionately large grooves and bores. In particular, a plurality of equally spaced radially extending circumferential grooves define a plurality of circumferentially spaced bearing pads 832. The bearing pads 832 are further defined by a pair of axially extending circumferential grooves which extend symmetrically from the planar faces of the cylindrical blank and are best seen in FIGS. 33B and 33c in which the grooves are indicated by the reference numerals 834 and 835. The bearing support structure is defined by the aforementioned structural features and by a plurality of circumferentially spaced symmetrically disposed shallow bores 838 and a plurality of circumferentially spaced symmetrically disposed deep bores 837. Because of the presence of the "hidden" bores 837, 838, the bearing construction of FIG. 33 is not extrudable and not moldable in a simple two-piece mold, i.e., not easily moldable.

Figure 33A:
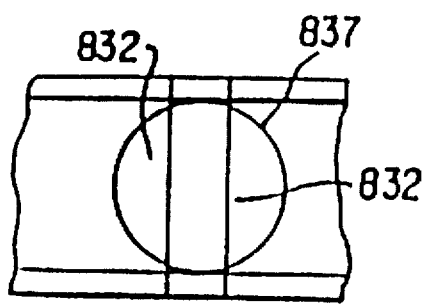
FIG. 33A is a detail of a portion of the outer periphery of the bearing of FIG. 33.
Figure 33B:
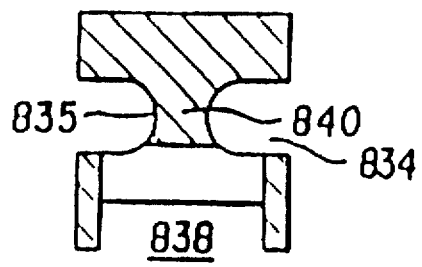
FIG. 33B is a cross-section of the bearing of FIG. 33.
Figure 33C:
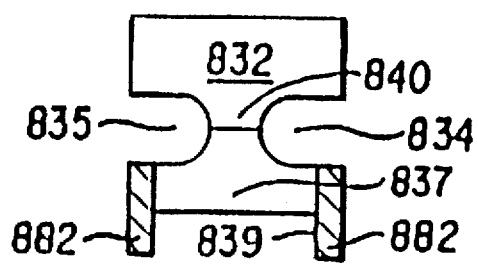
FIG. 33C is another cross section of the bearing of FIG. 33.

As best shown in FIG. 33A, the deep bores 837 intersect the axial grooves 836 so as to define support structures for each bearing pad. The support structure is further defined by a circumferential groove 839 extending from the outer periphery of the cylindrical blank.

With reference to FIGS. 33-33c, it will be understood that the provision of the structural members as discussed above provide a support structure for the bearing pad 832, which includes a beam 840 directly supporting the pad, i.e. a primary support structure, two continuous beams 882, i.e. a tertiary support structure and a secondary support structure comprising a plurality of beams defined in part by bores 837 and 838 connecting the beam 840 to the continuous beams 882.

Because the support structure of the bearing illustrated in FIGS. 33-33C is non-symmetrical about the pad center line extending from the major axis 806, it is uni-directional. Further, like the bearing of FIG. 32, this bearing is particularly well suited to applications requiring extremely small bearings since the proportionately larger grooves and bores which define this bearing and its support structure are more easily manufactured.

Figure 34:
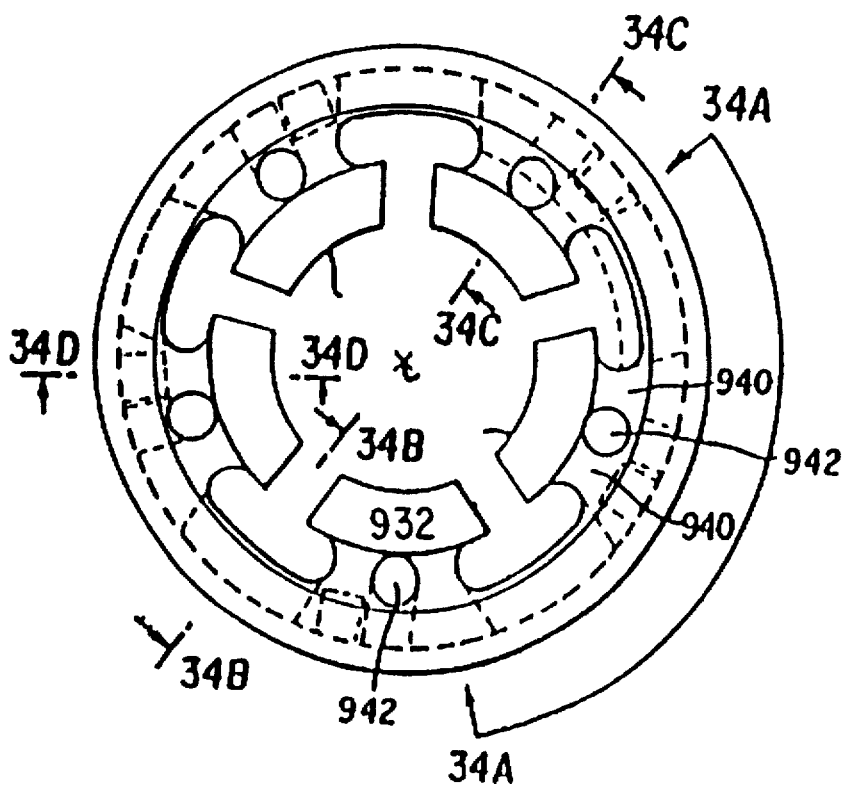
FIG. 34 is a side view of another journal bearing according to the present invention.
Figure 34A:
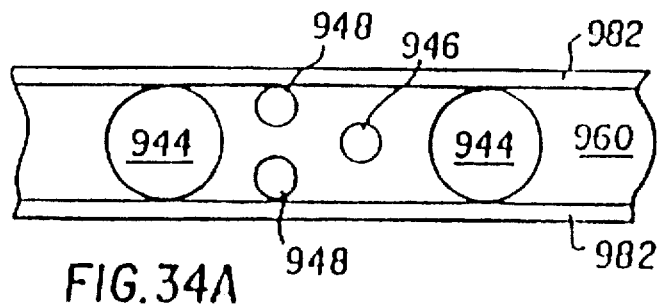
FIG. 34A is a detail of a portion of the outer periphery of the bearing of FIG. 34.
Figure 34B:
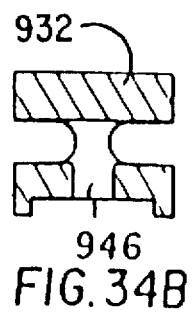
FIG. 34B is a cross-section of the bearing of FIG. 34.
Figure 34C:
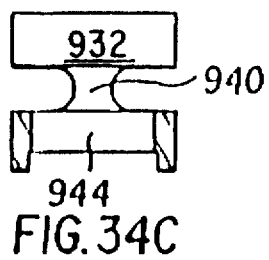
FIG. 34C is another cross-section of the bearing of FIG. 34.
Figure 34D:
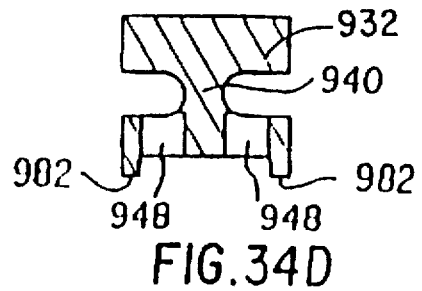
FIG. 34D is another cross-section of the bearing of FIG. 34.

FIGS. 34 and 34A-34D illustrate another journal bearing construction in accordance with the present invention. The bearing construction of FIG. 34 is similar to that of FIG. 33 insofar as the bearing pads and their support structures are defined by proportionately large grooves and bores as shown in the drawings. The support structure for the bearing pads 932 is like the support structure for the bearing pads 832. In particular, while the support structure for each of the bearing pads 932 is identical, the support structure is not symmetrical with respect to each bearing pad. Hence, the bearing illustrated in FIG. 34 is unidirectional. Moreover, because the support structure includes "hidden" openings, the bearing is neither extrudable or moldable in a simple two-piece mold.

As shown in the drawings, the bearing support structure includes a primary support structure comprising a pair of beam-like members 940 which are connected to the bearing pads 932 and defined in part by symmetrically disposed openings 942. A shallow circumferential groove formed on the outer periphery of the bearing defines a tertiary support structure comprising a pair of continuous beam-like elements 982. A secondary support structure comprising a beam and membrane network 960 for connecting the beams 940 to the continuous beams 982 is defined by the provision of a plurality of large symmetrically disposed bores 944, the provision of smaller symmetrically disposed bores 946 and the provision of small non-symmetrically disposed bores 948. By virtue of the provision of the non-symmetrically disposed bores 948, the support structure is more flexible, and thus biased, in the direction of those bores.

In the past, the pad shape of hydrodynamic bearings has been primarily dictated by manufacturing convenience. For a thrust bearing, this has traditionally meant sector shaped pads to maximize the area of support or—in the case of applicant's prior U.S. Pat. No. 4,676,668—circular pads for low cost manufacture. For radial bearings, pads having a simple cylindrical section shape have been used. In many cases, such conventional pad shapes can be supported to obtain optimum results. However, the present inventor has discovered that important performance characteristics can be achieved by modifying conventional pad shapes. Consequently, the support structure can be simplified, and in some cases, even eliminated.

Figure 36:
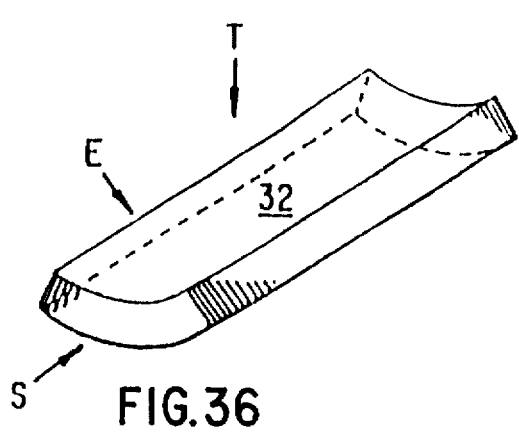
FIG. 36 is a perspective view of a journal bearing pad with arrows indicating the side lines for a top edge and side view.

An example of a typical radial bearing pad is shown in FIG. 36. The sight lines for a top view T, an edge view E and a side view S are indicated by arrows labeled T, E and S, respectively.

Various modifications to traditional, radial pad shapes will be discussed hereinafter. It should kept in mind that any of these modifications to the shape of the pad may be used in combination or alone. Also, the modifications can be easily adapted to pads having shapes other than the specific pad shapes illustrated. Moreover, the pads may be symmetrically shaped to allow bidirectional operation or non-symmetrical to provide different operating conditions depending on the direction of rotation. The modified pad shapes discussed hereinafter may be used in combination with any support structures including those described in this application where appropriate or, when used in the proper combination, may eliminate the need for a deflecting support structure altogether.

Figure 37:
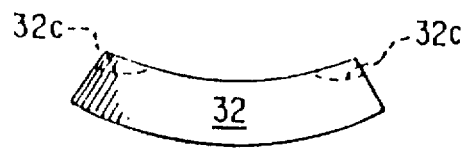
FIG. 37 is a side view of a journal bearing pad with radius cuts formed on both edges.
Figure 38:
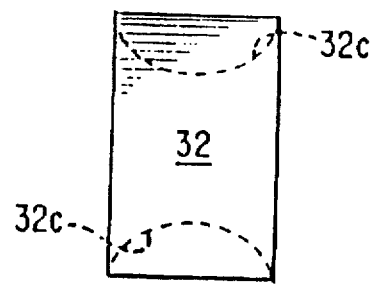
FIG. 38 is a top view of the journal bearing pad of FIG. 37.

The first possible modification to the general pad shape is shown in FIGS. 37 and 38.

This modification is based on finite element analysis which has shown that, in some instances, increasing the length of the edge where the lubricant enters (the leading edge) can improve bearing performance. Specifically, lengthening this edge allows more lubricant to be directed toward the pad center. To achieve this effect a radius cut may be formed on the pad surface to lengthen the leading edge. The cut may be formed either entirely through the pad or partially through the pad surface to provide a recess in the pad surface. It should be kept in mind that the provision of such a radius cut decreases the load bearing surface of the pad. Thus, there is a trade off; more lubricant but less load bearing surface.

FIGS. 37 and 38 show side and top views respectively of a radial bearing pad 32 formed with radius cuts 32C at each edge. The provision of the radius cuts 32C increases the amount of lubricant entering the pad center at the same time reducing the load bearing surface area of the pad. The radial bearing shown in FIGS. 37 & 38 is a bidirectional pads since it is symmetrical with radius cuts 32C formed in each edge.

Figure 39:
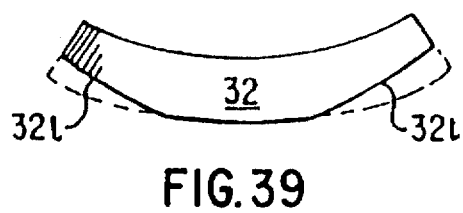
FIG. 39 is a side view of a journal bearing pad with tapered edges.

FIG. 39 illustrates another possible modification to the basic pad shape. Specifically, tapering the leading edge of the bearing pad results in increased inlet bending. This allows more lubricant to enter into the shaft-pad space which increases the load carrying capability of the pad. Complex finite element analysis using computers can predict the amount of bending needed to obtain optimum lubricant flow.

FIG. 39 shows a side view of a radial bearing pad 32 with a taper 32t formed at each edge thereof to allow bidirectional operation.

The basic pad shape may also be modified by providing rails on the side edges of the pads such that, under load, the pad deflects to form a channel which retains lubricant on the pad face and minimizes end or side leakage.

Figure 40:
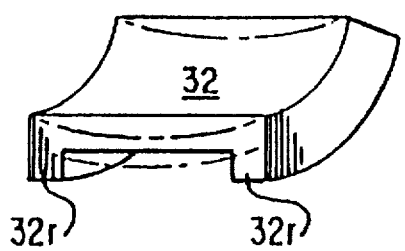
FIG. 40 is an edge perspective view of a journal or radial bearing pad provided with side edge rails on its axial edges.

Examples of pad shapes so modified are shown in FIG. 40.

FIG. 40 shows a radial or journal bearing pad 32 provided with side edge rails 32r on its axial edges. The deflection of the pad under load, again greatly exaggerated, is illustrated in phantom. As is apparent from this exaggerated example, the pad deforms under load to form a lubricant retaining channel to prevent leakage of lubricant along the axial ends of the bearings.

Figure 41:
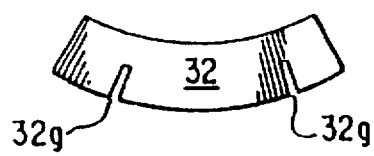
FIG. 41 is a side view of a radial or journal bearing pad having grooves formed in the bottom proximate the sides.

As mentioned before with reference to FIG. 39, it is sometimes desirable to increase the inlet bending of the leading edge of a bearing pad. Another modified bearing pad shape for achieving or enhancing this desired result is shown in FIG. 41. Specifically, in addition to or instead of tapering the leading edge, a groove may be formed on the lower edge of the lower side of the pad proximate the leading edge to cause increased leading edge bending while maintaining a flatter surface. FIG. 41 shows a radial bearing pad 32 with grooves 32g formed on the outer surface proximate each side edge.

Figure 42:
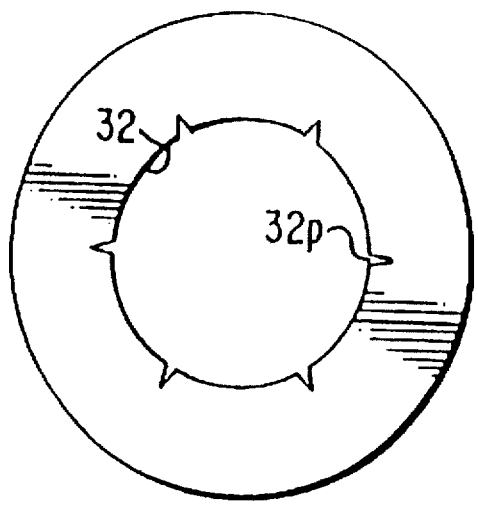
FIG. 42 is a side view of a radial or journal bearing in which the individual pads are defined by pad defining grooves.

Another consideration in the design of hydrodynamic pads is that the pads themselves may be formed from a single member by simply providing grooves to define individual pads. FIG. 42 illustrates how a cylindrical body may be divided into individual journal pads 32 through the provision of pad defining grooves 32p on the radially inner surface thereof.

Figure 43:
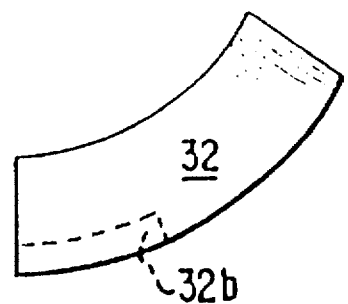
FIG. 43 shows a side view of a radial bearing pad formed with a bottom recess indicated in phantom.

A final consideration in the design of specific pad shapes is the provision of bottom recesses on the pads. Specifically, the provision of bottom recesses can cause channeling in a manner somewhat like that shown in FIG. 40 and allow inlet bending in a way such as the tapered structure shown in FIG. 39. An example of bottom recesses formed in pads designed for unidirectional operation is shown in FIG. 43. The only difference is that the pad would be formed of a conical section.

FIG. 43 shows a radial bearing pad 32 provided with a bottom recess 32b on one edge thereof. Again, this is a unidirectional bearing.

Figure 44:
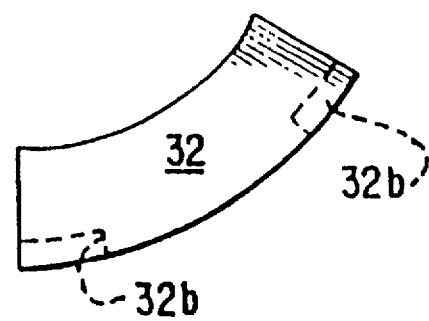
FIG. 44 is a side view of a radial or journal bearing pad with bottom recesses formed proximate each edge as indicated in phantom.

FIGS. 44 illustrates bearing pad configurations similar to those shown in FIG. 43 except that the bottom recesses 32b are provided at both edges of the bearing pad so as to permit bidirectional operation. Specifically, in FIG. 44 the radial bearing pad 32 includes bottom recesses 32b at each edge thereof. Again, the recesses are somewhat shorter than the recesses provided in the unidirectional bearing shown in FIGS. 43.

As mentioned before, the design of a pad shape for any particular application depends on the requirements of that application. The foregoing structural modifications and considerations can be used alone or in combination.

Figure 45:
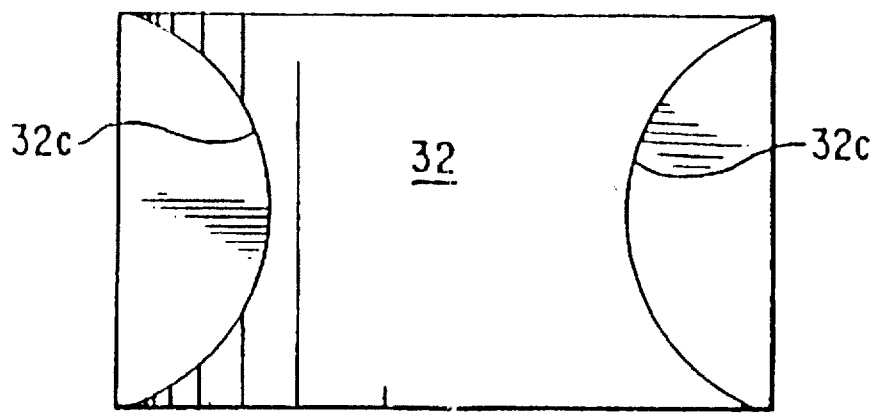
FIG. 45 is a top view of a bearing pad for a radial bearing.

FIG. 45 shows a top view of a journal or radial bearing pad 32 having a radius cut 32C formed in each edge thereof to increase the length of the leading edge. This increases the amount of lubricant passing on to the bearing pad surface.

Figure 46:
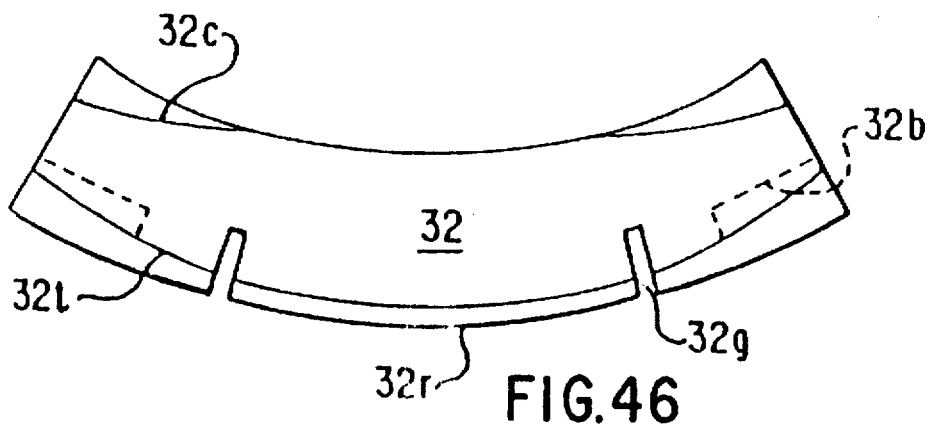
FIG. 46 is a side view of the bearing pad of FIG. 45.

FIG. 46 shows a side view of the bearing pad 32 of FIG. 45. From this view, it is possible to see the radius cut 32C formed on the top surface of the pad, the taper 32t formed at the bottom edges of the pad, the bottom recess 32b formed on the bottom side of the pad, the grooves 32g formed on the bottom side of the pad and the rails 32r extending radially outward from the bottom surface of the pad.

Figure 47:
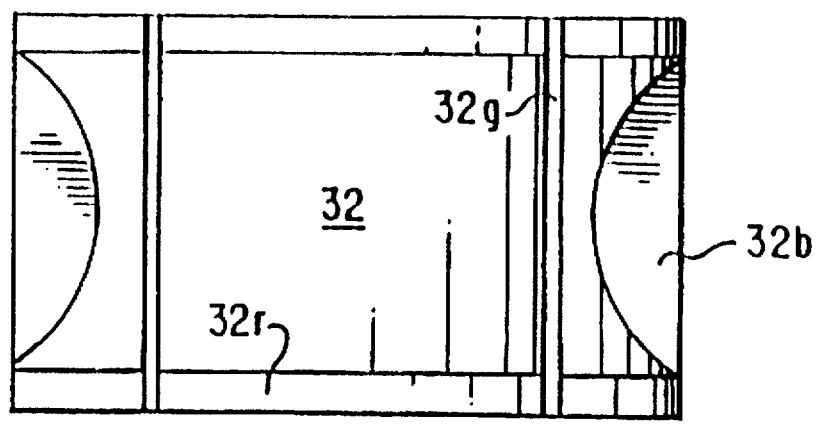
FIG. 47 is a bottom view of the bearing pad of FIG. 45.

FIG. 47 shows the bottom view of the bearing pad of FIGS. 45 and 46 in which the bottom rails 32r, the grooves 32g and the bottom recess 32p are apparent. If desired, a bearing having pads of the type illustrated in FIGS. 45 and 46 could be formed from a single piece with the pads separated from one another by pad defining grooves as shown in FIG. 42.

An important aspect of the present invention is the disclosure of machinable bearing shapes i.e., bearing shapes which can be produced by machining a piece of heavy walled tubing or similar cylindrical journal using standardly available machining techniques. Such bearings are characterized by the fact that they are formed from a piece of heavy walled tubing or similar cylindrical journal through the provision of bores, slits and grooves. The advantage of such bearings is that it is easy to manufacture prototypes and to modify these prototypes after testing. Naturally, when the bearings are to be mass produced, using, for example, molding or casting techniques, different manufacturing considerations may dictate different shapes. It is important to recognize that changes in shape affect bearing performance.

Another manufacturing consideration is ease of molding. Naturally, most of the bearing constructions of the present invention are capable of being molded by some molding technique. However, only certain shapes can be injection molded in a simple two-piece mold, i.e., a mold which does not include cams. Another advantage of the bearings of the present invention is that the bearings can be constructed with easily moldable shapes which are defined as shapes which can be injection molded using a simple two-piece mold. An easily moldable shape generally is characterized by the absence of "hidden" cavities which require cams for molding. For instance, with respect to radial bearings, an easily moldable shape includes no radially extending grooves in the inner and outer diameter and a continuous axial cross section. The bearing shown in FIGS. 32, 32A and 32B is an example of an easily moldable radial or journal bearing.

Figure 35:
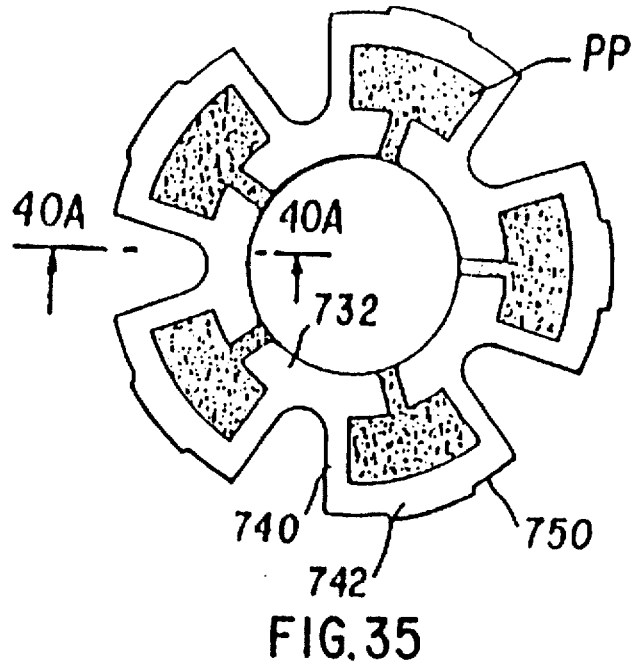
FIG. 35 is a side view of a self-lubricating bearing according to the present invention.
Figure 35A:
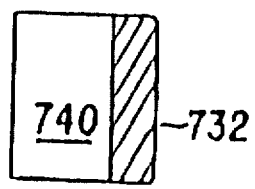
FIG. 35A is a cross-section of the bearing of FIG. 35.

In certain gas or air lubricated deflection pad bearings, there are cases where loads or speeds exceed the capability of an air film. In these cases, it is necessary to introduce a liquid type lubricant into the converging wedge without providing a liquid reservoir or bath. FIGS. 35–35A. illustrate bearing constructions for achieving this purpose. In particular, these drawings illustrate a novel self-lubricating deflection pad bearing in accordance with another important aspect of the present invention. The bearing is essentially a deflection pad bearing of the type described herein which has been modified to include lubricating plastic in its various openings.

The plastic employed in the bearing is a conventional castable porous plastic which is capable of absorbing lubricating liquid when soaked in such a liquid, one such plastic is sold under the trade name POREX™. Generally, the porous plastic can be formed from various plastics by injecting air into the plastic material to form the pores. In particular, the liquid is absorbed into the porous plastic in a wick like manner and held in place by the plastic.

The lubricating deflection pad bearing is constructed by taking a conventional journal, thrust or combined radial and thrust deflection pad bearing of the type described above and casting or injecting the conventional porous plastic around and into the spaces between the deflection members. As a consequence of this construction, during operation, the movement of the shaft and the compression of the deflection members causes the lubricating liquid to leave the porous plastic and to be drawn into the leading edge of the converging wedge. The formation of the liquid filled wedge greatly increases the load and speed capability of the bearing. After the liquid passes over the pad surface, it is reabsorbed by the porous plastic after leaving the trailing edge.

An important aspect of the present invention is the composite structure combining a standard bearing material with the porous plastic. By virtue of this composite, it is possible to take advantage of the unique characteristics of both -materials. More specifically, conventional porous plastics alone make poor deflection pad bearing materials because the pores in the plastic are actual voids that are detrimental to the development of the very thin fluid film. On the other hand, conventional plastic or metal bearing materials not having the pores are incapable of absorbing lubricant to any great extent. However, through the use of both materials in the manner described, an effective self-lubricating hydrodynamic bearing can be obtained. Further, there are synergistic results from the combined use of standard bearing material and lubricant absorbing porous plastic. For example, the deflections of the bearing surface assist in forcing the liquid lubricant into the leading edge. Moreover, channelling or lubricant retaining deformation of the bearing surface assists in containing the liquid.

FIGS. 35 and 35A show an example of the self-lubricating deflection pad bearing of the present invention. In particular, these drawings show bearings similar to bearings described previously which have been modified to include the liquid absorbing porous plastic filled into the spaces between the deflection members. To some extent, the bearing acts as a skeletal portion and the porous plastic portion acts as a lubricant retaining and releasing sponge.

In particular, FIGS. 35 and 35A show a self-lubricating bearing having an underlying bearing structure which is essentially identical to the bearing shown in FIGS. 32 and 32A. However, the bearing structure of FIG. 35 is modified such that porous plastic fills the openings between the bearings and the openings within the support structure which are continuous with the spaces between the bearing pads 732. Naturally, the spaces under the bearing pads could be filled with porous plastic as well. However, unless there is communication between the porous plastic and the bearing pad surface, the provision of such porous plastic areas would be fruitless.

The manufacture of the self-lubricating deflection pad bearing involves three general steps. First, the basic bearing or skeletal portion is formed of standard bearing material. Second, the porous plastic is injected into the desired spaces in the bearing structure. For purposes of manufacturing convenience, the plastic is injected into the bearing without lubricant. Finally, the bearing, with the porous plastic injected into the desired spaces, is loaded with liquid lubricant. To properly load the plastic with liquid lubricant, it is necessary to work the lubricant in from one side. The merging in the liquid results in an unfilled internal portion. This is caused by not allowing the pores to vent from one side.

The bearings of the present invention may be designed to have an interference fit when installed on the shaft such that as the bearing is forced on the shaft, the pads deflect slightly so as to form a converging wedge shape while in the stationary installed position. The trailing edge bearing pad contacts the shaft. At instantaneous start up, the fluid film enters the wedge and builds up fluid pressure causing separation of the shaft and pad. Thus, in accordance with another important aspect of this invention, the bearings of the present invention may be designed and dimensioned such that the trailing edge of the bearing is in contact with the shaft portion to be supported when the shaft is at rest.

Figure 1C:
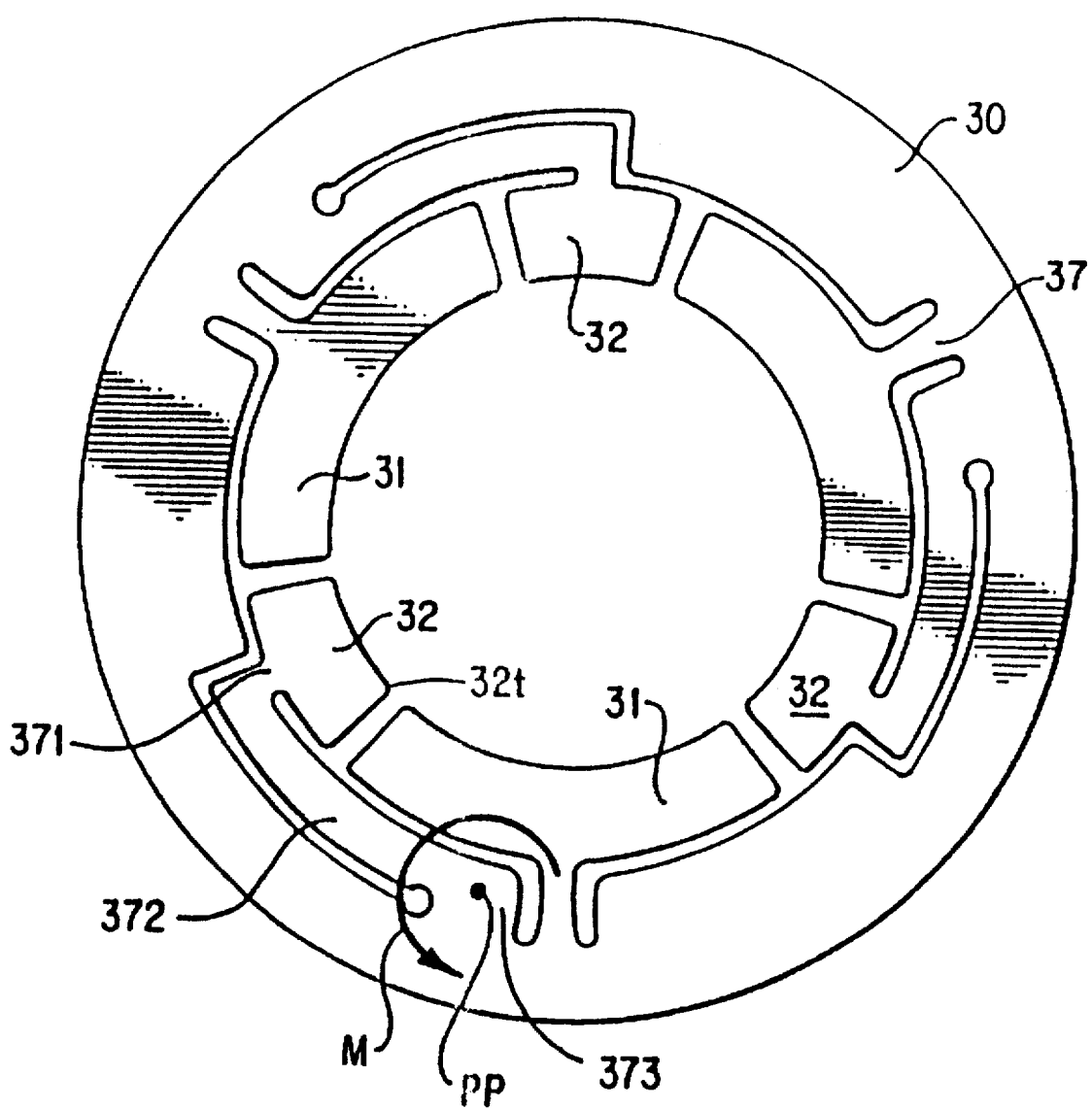
FIG. 1C is a side view of a hydrodynamic bearing according to the present invention.

FIG. 1C shows a side-view of a three pad positive-centering deflection pad bearing for use in applications where floating of the axis of rotation must be minimized or eliminated. As shown in FIG. 1C, the bearing includes two different types of bearing pads: circumferentially short pads indicated at 32 and circumferentially long pads indicated at 31. The short pads 32 operate as flexible centering pads. These pads begin at zero clearance, i.e., shaft contact and expand at design speeds under hydrodynamic pressure to a larger operating clearance. The larger, centrally pivoted pads 31 offer low pivot rotational stiffness and high radial stiffness to attenuate unbalanced response and maintain stability.

The operation of the larger centrally pivoted pads 31 is similar to tilt type pads described above in connection with FIGS. 1A and 1B. The pads 31 are supported by a single ligament 37 for simple flexibility in the plane of the paper of the drawing. It is critical, however, that the ligaments be so thin as to offer virtually no resistance to pivots. At a minimum, the radial length of the ligaments should exceed their circumferential width. In essence, the larger pads 31 have a support structure 37 which allows simple pivoting of the pad 31. It is known that a simple pivoting construction like this provides adequate support at operational speeds.

To ensure proper shaft centering and support at start up, the smaller pads 32 have a more flexible support structure. Specifically, the support structure of the pads 32 includes a primary support portion 371 in the form of a stub type shaft, a secondary support portion in the form of a elongated circumferential beam 372 and a tertiary support portion 373 in the form of a stub shaft connecting the secondary support portion 372 to the base or outer periphery of the bearing 30.

Because of the elongated nature of the beam 372, any force acting on the surface of the pad 32 causes pivoting about a pivot point PP as illustrated in FIG. 1C. This pivot point PP is located circumferentially beyond the trailing edge 32t of the bearing pads 32. As a consequence, any force acting on the pad 32 causes a moment M to be generated in the direction shown in FIG. 1C. This ensures that under static state, contact between the pad 32 and the shaft occurs only at the trailing edge of the pad. In this way, a preformed wedge is formed even in the static state.

Moreover, the contact between the shaft and each trailing edge of each of the pads 32 collectively maintains the shaft center in the proper position. Thus, a hydrodynamic effect occurs immediately upon start up while at the same time the shaft is properly centered and shaft run out does not occur. Thus, this hydrodynamic bearing, unlike known hydrodynamic bearings, can be used in applications where shaft float is unacceptable such as, for example, a mechanical face seal of the gap type. The advantages of hydrodynamic bearings versus rolling element type bearings are set forth above. An additional important advantage occurs at high speed where rolling element bearings are subject to rapid wear, but hydrodynamic bearings perform without wear because there is no shaft-to-pad contact.

The particular bearing construction shown in FIG. 1C includes two types of pads support structures. This provides a wide range of support conditions. It should be understood, however, that bearings could be designed such that each of the pads are supported in the same way. If shaft centering is required, then each support structure should be designed like the support structure of the bearing pads 32 such that the pivoting caused by static load occurs beyond the trailing edge of the pad in the manner shown in FIG. 1C so that under static loading the pads are deflected to that only their trailing edge contacts the shaft. This ensures that a preformed wedge is formed and at the same time properly centers the shaft.

In small quantities, the bearings disclosed herein are preferably constructed by electrical discharge machining or laser cutting methods. The double lines shown in the drawings are the actual paths of the wire or beam which is typically 0.002–0.060" (0.50–1.52 mm) in diameter. The lubricant that flows into the electrical discharge machined paths acts as a fluid dampener that reduces any vibration or instability at resonant frequencies. In the situations described above where a continuous cylindrical membrane is formed, the damping takes the form of a dash pot that exhibits high damping characteristics. A significant consideration in the design is that the support structure length and direction be oriented to provide the inward deflection shown in FIG. 3. Also, minute deflections of the pads themselves in the direction of load, as shown in FIG. 9, result in eccentricity changes which further improve bearing performance. It is noted that in Faires, Design of Machine Elements, the distance between the center of the bearing and the center of the shaft is called the eccentricity of the bearing. This terminology is well known to those skilled in bearing design. With the novel approach of tuning or modifying the stiffness of the bearing configuration or structure and particularly the beam to suit a particular bearing application, optimum performance is readily obtained. Recent computer analysis has demonstrated that virtually any stiffness or deflection may be accomplished.

As noted above, when manufacturing low volumes or prototypes of the bearings of the present invention, the bearings are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to employ plastics, ceramics, powdered metals or composites to form the bearings of the present invention. It is believed that methods such as injection molding, casting, powdered metal die casting with sintering and extrusion are sufficiently well known that the processes need not be detailed herein. It is also believed that once a prototype bearing is constructed, the method of producing a mold or the like for mass production of the bearing is well known to those skilled in the molding and casting art. Moreover, it is to be understood that only certain types of the bearings of the present invention are adapted to be made in high volumes through extrusion. Generally, these are the bearings that are formed only through the provision of circumferential grooves and radial and circumferential cuts or slits which extend axially throughout the entire bearing, i.e., those bearings having a constant or otherwise extrudable cross-section.

In accordance with another aspect of the present invention, a novel investment casting method has been found to be particularly useful in the manufacture of intermediate quantities, e.g., less than 5,000 bearings. In accordance with this method of manufacture, the first step of the investment casting procedure is manufacture of a prototype bearing. As discussed above and detailed below, the prototype can be manufactured in any number of ways, but is preferably manufactured by machining a piece of heavy walled tubing or similar cylindrical journal. In larger bearings, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. However, in either application, the journals are typically turned and milled to form the larger grooves.

After the prototype bearing is formed, it may be desirable to test the prototype to confirm that the bearing functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the bearing.

After the wax casting is obtained, it is used to form a plaster mold. This step typically involves encasing the wax casting and plaster, allowing the plaster to harden around the wax casting so as to form a plaster mold.

The plaster mold can then be used to form a bearing. Specifically, molten bearing material, such as bronze, is poured into the plaster mold so as to melt and displace the wax casting from the mold. Thus, the plaster mold is filled with molten bearing material and the melted wax is removed from the plaster mold.

After the molten bearing material is allowed to harden, the plaster mold is removed from around the bearing and a bearing is obtained.

Because this method of manufacture involves the sacrifice of a wax casting, it is known as investment casting or sacrificial casting.

Despite the fact that the investment or sacrificial casting method described above involves sacrifice of a wax casting and the production of both rubber and plaster molds, and is quite labor intensive, it has proven to be cost effective when intermediate quantities, e.g., less than 5,000 units, of a particular bearing are required. The cost effectiveness of this procedure f or lower quantity bearing requirements is due to the fact that the molds used in this method are far less expensive to produce than the complex mold required for injection molding or powdered metal casting.

As noted above, the first step in the investment casting method, indeed in any method, of producing bearings in accordance with the present invention is the production of a prototype bearing. In accordance with another aspect of the present invention, the relatively complex journal and thrust bearings of the present invention can be formed using simple manufacturing techniques. Similar techniques are used for both thrust and journal bearings.

With the foregoing in mind, it is believed sufficient to describe the method of making a single journal bearing through the use of electrical discharge manufacturing and machining. It is believed that a description of such manufacture demonstrates the ease with which the relatively complex bearing shapes of the present invention can be achieved.

Each bearing is initially in the form of a cylindrical blank having a cylindrical bore as shown in FIGS. 11A and 11B. The blank is then machined to provide a radial lubricating fluid groove as shown in FIGS. 12A and 12B. For certain applications, it is desirable to further machine the blank to include facing grooves which are preferably symmetrically disposed on the radial faces of the bearings as shown in FIGS. 13A and 13B. The provision of such facing grooves ultimately results in a bearing which is easily torsionally deflected. While the groove shown in FIGS. 13A and 13B are cylindrical, it is possible to provide tapered grooves as shown in FIGS. 14A and 14B. As will become evident below, this yields a bearing which exhibits improved deflection characteristics by virtue of the angled alignment of the support beams. In this context, it should be noted that it is preferable that the support beams as viewed in FIG. 14A are tapered along lines which converge at a point proximate the center line of the shaft. This ensures that flexibility occurs about the shaft center line by establishing a center of action for the entire system such that the pads may adjust to shaft misalignment. In essence, the tapering of the support beams causes the bearing to act in a manner similar to a spherical bearing by concentrating the support forces on a single point about which the shaft may pivot in all directions to correct any misalignment. The arrows in FIG. 14A illustrate the lines of action of the deflection.

Bearings having cross sections of the type shown in FIGS. 12A and 14A are particularly effective at retaining the hydrodynamic fluid. This is because the bearing pad is supported proximate the axial ends of the bearing pad and the central portion of the bearing pad is not directly supported. By virtue of this construction, the bearing pad is supported so as to deform under load to form a fluid retaining concave pocket, i.e. the central portion of the bearing pad deflects radially outward. This greatly decreases fluid leakage. Naturally, the degree of pocket formation depends of the relative dimensions of the bearing pad and support structure. A larger fluid retaining pocket could be obtained by providing a thinner bearing pad surface and supporting the pad surface at the extreme axial ends of the bearing pad.

After the cylindrical blank is properly machined as shown in FIGS. 12A and 12B, FIGS. 13A and 13B, or FIGS. 14A and 14B radial and/or circumferential slits or grooves are formed along the radial face of the machined blank to define the bearing pads, the beam supports and the housing. FIGS. 14C and 14D illustrate such grooves formed in the machined blank of FIGS. 14A and 14B. When manufacturing low volumes of the bearings or prototypes of the bearings for use in the construction of a mold, the cuts or slits are preferably formed through electrical discharge manufacturing or through the use of a laser. The machining of the cylindrical blanks to achieve the configurations illustrated in FIGS. 12A and 12B, FIGS. 13A and 13B, FIGS. 14A and 14B or a similar shape can be done through conventional machine tools such as a lathe or the like.

The performance characteristics of the bearings of the present invention result from the relative shape, size, location and material characteristics of the bearing pads and the beam supports defined by the bores and cuts or slits formed in the machined blank. These parameters are largely defined by the dimensions and location of the radial circumferential bores, cuts or slits formed in the bearing in conjunction with the shape of the machined blank in which the bores or slits are formed to yield the bearing.

As noted above, while the construction of the bearings of the present invention is most easily understood by reference to the machining process, larger quantities are preferably manufactured through the investment casting method of the present invention, and even larger scale production of the bearings contemplated by the present invention could be more economically performed through injection molding, casting, powdered metal, die casting, extrusion or the like.

In extruding a large number of bearings from a pipe-like cylindrical blank, radial lubricating fluid grooves, as shown in FIGS. 12A and 12B can be provided along the length of the pipe-like cylindrical blank prior to extrusion. However, if facing grooves were desired in the bearing, these can be individually defined after slicing the individual bearings from the extruded and machined blank. For this reason, extrusion might not be a preferred method of producing bearings which require facing grooves to enhance torsional flexibility.

To obtain variable pad geometry in a one-piece design using a single ligament supporting its pad, the ligament must be flexible enough that the pads rotating with the load imposed by the rotating shaft as shown in FIG. 1D. This characteristic, flexural rotation, distinguishes the present invention from other fluid film bearings. The capability of the pad to flex and rotate with the load allows cross coupling stiffness to approach zero as with a tilt pad bearing. This ensures stable operation. The web dimensions depend on the load being applied in a particular application and on other parameters which vary depending on the specific application and material construction of the bearing. The values for the rotational stiffness in a particular application are determined from a stability analysis where the stiffness is varied until a range is reached where the rotational flexibility provides performance comparable to tilt pad bearings. Tilt pad bearings tilt and build a pressure in the oil film which is symmetric around the shaft journal. The bearings of the present invention also tilt, but the tilt is not due to the rolling action as in standard tilt pad bearings. Instead, the tilt in the bearings of the present invention is due to the flexibility of the web section which allows the pad to rotate or tilt and accommodate the applied load. Although specific dimensions depend on the specific application the ligaments should as a rule be longer in the radial direction than they are wide in the circumferential direction.

What is claimed is:

1. In an assembly that includes a shaft and a supply of liquid, a fluid film bearing for pressurizing the liquid so as to support the shaft for rotation on a pressurized liquid film, the bearing comprising: a plurality of substantially circumferential bearing pads spaced about the shaft, each of the bearing pads having a shaft support surface; a bearing housing extending radially outside the bearing pads and encircling the bearing pads; at least one support member extending between one of the pads and the bearing housing so as to support the pad for movement, the support member comprising a radially outermost portion secured to the bearing housing, a radially innermost portion secured to the bearing pad and a central portion extending between the inner portion and the outer portion, whereby, under load, the support member bends so that the pad moves relative to the shaft, and a hydrostatic feed passage formed in the bearing and providing communication between a supply of pressurized fluid and the bearing pad shaft support surface.

2. The bearing of claim 1, wherein the support member supporting the bearing pad comprises a single web extending radially between one of the pads and the housing to support the pad for pivoting movement.

3. The bearing of claim 2, wherein the hydrostatic feed passage extends radially through the single web to the surface of the pad supported by that web.

4. The bearing of claim 1, wherein the radially innermost portion, the radially outermost portion and the central portion of the support member are all integrally formed as one piece.

5. The bearing of claim 1, wherein the radially innermost portion is rigidly secured to the bearing pad and the radially outermost portion is rigidly secured to the bearing housing.

6. The bearing of claim 1, wherein the radially outermost portion is formed separately from the bearing housing, but rigidly secured thereto by a threaded attachment element.

7. The bearing of claim 1, wherein the support member is integrally formed with the bearing pad and the bearing housing.

8. The bearing of claim 1, wherein the bearing has an inner periphery defined by the bearing pad surface and the hydrostatic feed passage extends radially in a straight line from the bearing housing through the support member to the bearing pad surface.

9. The bearing of claim 1, wherein the hydrostatic feed passage has a constant size from the bearing housing to the bearing pad surface.

10. The bearing of claim 1, wherein the bearing has two circumferential edges and comprises a hydrostatic recess formed in the bearing pad surface at a location that is equally spaced from the circumferential edges of the bearing pad and wherein the hydrostatic feed passage extends in a straight line from the bearing housing through the support member to the hydrostatic recess.

11. The bearing of claim 1, wherein the support member is secured to the bearing housing in a way that prevents any part of the support member from moving against the bearing housing and the support member is secured to the bearing pad in a way that prevents any part of the support member from moving against the bearing pad, whereby pad movement under load is accomplished entirely by bending of the support member.

12. The bearing of claim 1, wherein the support member is substantially radially inelastic and the support member is secured to the bearing housing such that the support member is prevented from moving radially inward.

13. A journal bearing for supporting a rotating shaft, the bearing comprising a plurality of circumferentially spaced bearing pads supported in a housing, each of the pads having a circumferentially curved shaft support surface, and further comprising a plurality of support posts, each of the support posts having one end secured in the housing and another end supporting a bearing pad, the support post being substantially radially inextensible, but circumferentially flexible, whereby each of the pads is supported for pivoting movement under load but anchored to the housing by the radially inextensible support post.

14. The bearing of claim 13, wherein the support posts are circular and a single post supports each bearing pad.

15. The bearing of claim 13, further comprising at least one hydrostatic feed passage extending through a support post and a bearing pad to the shaft support surface of the bearing pad.

16. A bearing supporting a rotating shaft, the bearing comprising a plurality of spaced bearing pads and a support structure for supporting the bearing pads, each of the bearing pads having a pad surface facing the rotating shaft, a support surface facing the support structure, a leading edge, a trailing edge and two side edges, wherein a single support member is provided on the support surface of the bearing pad at a location spaced from all edges of the bearing pad, the support member extending radially outward from the support surface to the support structure so as to provide the only support for the bearing pad on the support structure such that under load the pads move; the support member being secured to the bearing pad and the support structure in a way that prevents any part of the support member from moving against the bearing pad or support structure, whereby pad movement is accomplished by bending of the support member.

17. The bearing of claim 16, further comprising a hydrostatic feed passage formed in the bearing and providing communication between a supply of pressurized fluid and the bearing pad surface.

18. The bearing of claim 16, wherein the support member is formed separate from the bearing pad.

* * * * *